United States Patent [19]

Yamaguchi et al.

[11] Patent Number: 5,036,476

[45] Date of Patent: Jul. 30, 1991

[54] PRINTER CONTROL SYSTEM

[75] Inventors: Ikunori Yamaguchi; Yoshikazu Ikenoue, both of Osaka, Japan

[73] Assignee: Minolta Camera Kabushiki Kaisha, Osaka, Japan

[21] Appl. No.: 335,503

[22] Filed: Apr. 10, 1989

[30] Foreign Application Priority Data

Apr. 8, 1988 [JP] Japan ................................. 63-87569
Jul. 8, 1988 [JP] Japan ................................ 63-171480

[51] Int. Cl.⁵ ........................ G06F 15/00; G06F 3/12
[52] U.S. Cl. ................................... 364/519; 346/1.1; 346/160
[58] Field of Search ............... 364/519, 518, 521, 523; 346/1.1, 154, 160; 355/200, 202, 206, 208, 212, 214; 358/401, 444, 448

[56] References Cited

U.S. PATENT DOCUMENTS

| 4,063,221 | 12/1977 | Watson et al. ........................ 364/900 |
| 4,282,583 | 8/1981 | Khan et al. .......................... 364/900 |
| 4,353,653 | 10/1982 | Zimmerman ......................... 400/70 |
| 4,426,166 | 1/1984 | Bowling ................................ 400/63 |
| 4,452,136 | 6/1984 | Boynton et al. .................. 101/93.05 |
| 4,484,233 | 11/1984 | Strout et al. ..................... 364/523 X |
| 4,651,278 | 3/1987 | Herzog et al. ....................... 364/300 |
| 4,710,886 | 12/1987 | Heath .................................... 364/919 |
| 4,742,483 | 5/1988 | Morrell ................................. 364/900 |
| 4,754,428 | 6/1988 | Schultz et al. ...................... 364/900 |
| 4,843,405 | 6/1989 | Morikawa et al. .................... 346/1.1 |

FOREIGN PATENT DOCUMENTS 3506592 8/1985 Fed. Rep. of Germany .
2060318 4/1981 United Kingdom .
2156558 10/1985 United Kingdom .

OTHER PUBLICATIONS

Mohamed Rafiquzzaman publication "Microprocessors and Microcomputer Development Systems", pp. 99-100.
IBM Technical Disclosure Bulletin, vol. 22, No. 1, Jun. 1979 "Standard Printer or I/O Adapter Control Method and Apparatus".

Primary Examiner—Heather R. Herndon
Attorney, Agent, or Firm—Burns, Doane, Swecker & Mathis

[57] ABSTRACT

A printer apparatus which includes an image recording device for forming a visible image on a record medium, a memory unit for storing a plurality of different process programs each for controlling the operation of the image recording device, and a controller for controlling the image recording device in accordance with a selected one of the process programs for enabling the recording device to reproduce on the record medium an image corresponding to the image data supplied from a data processing device. The instruction signal from the data processing device is decoded and any one of the different process programs is selected on the basis of the decoded instruction signal, whereupon the image recording device is controlled in accordance with the selected process program for enabling the recording means to reproduce on the record medium an image corresponding to the image data supplied from the data processing device.

15 Claims, 26 Drawing Sheets

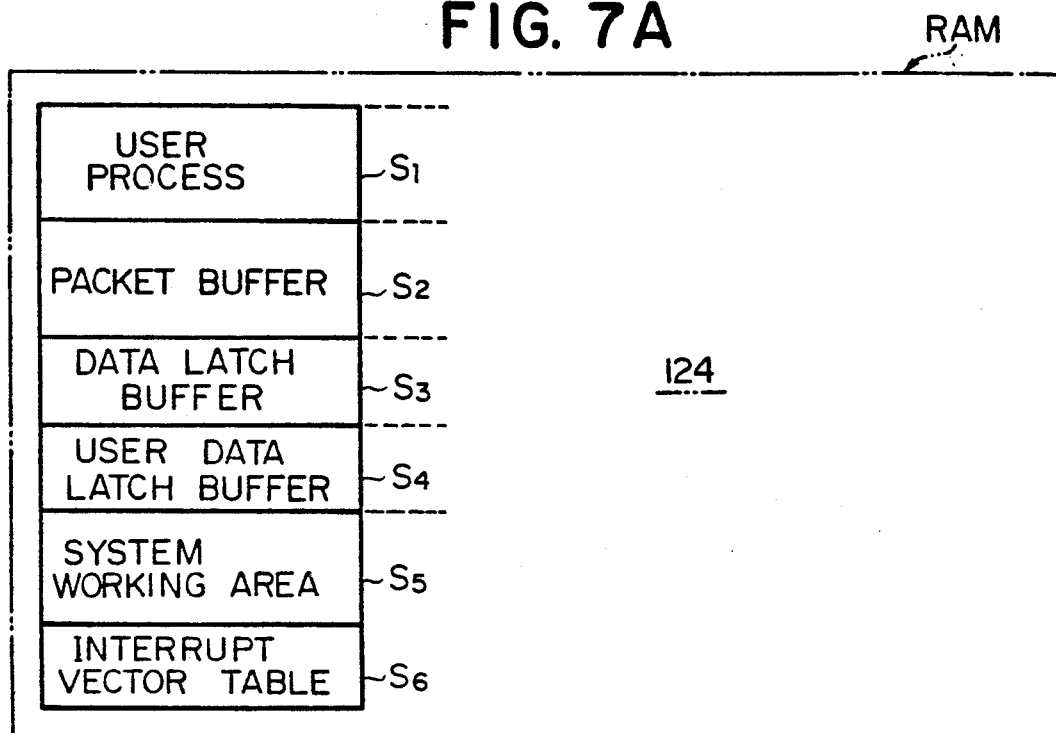
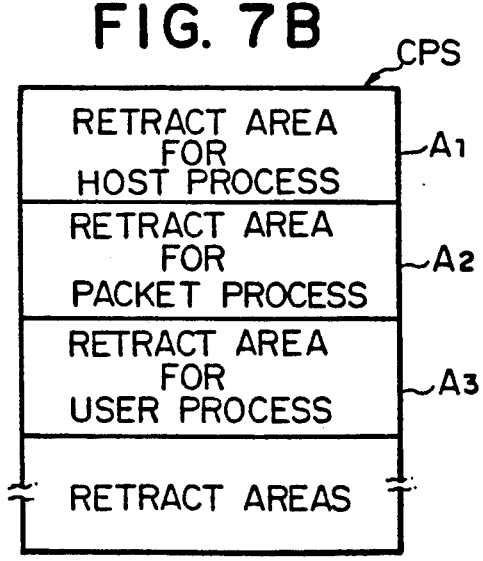

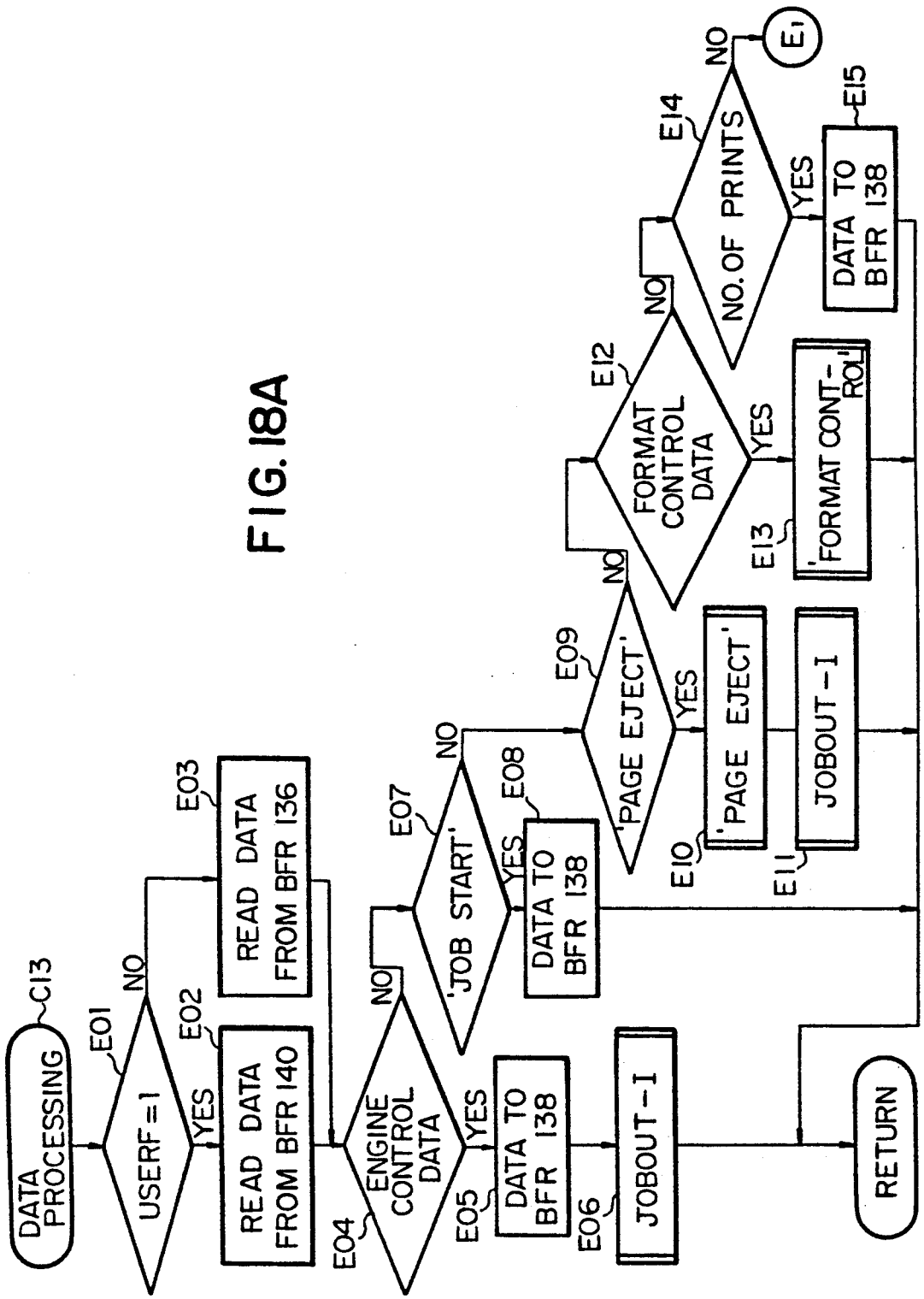

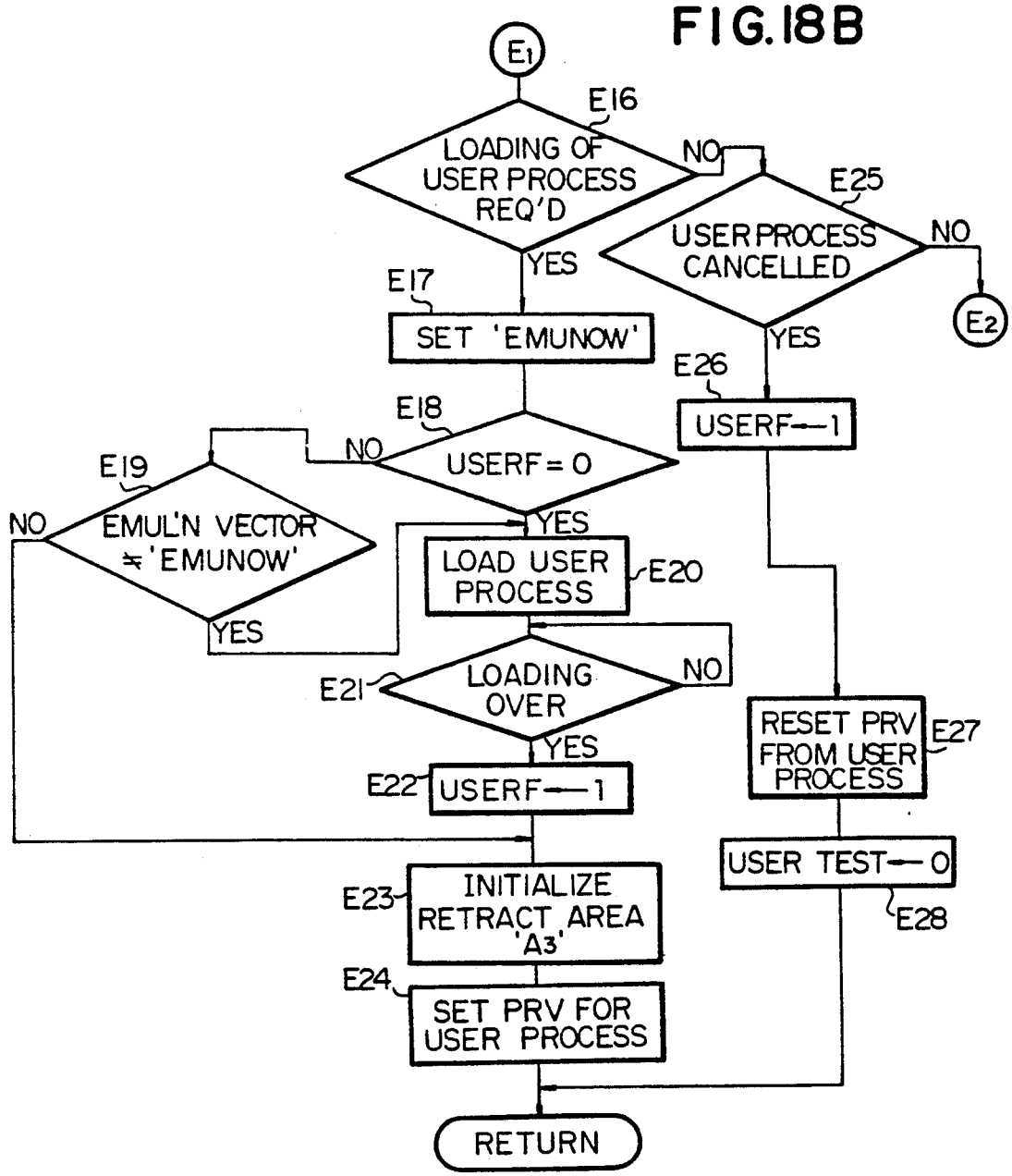

PRINTER CONTROL SYSTEM

FIELD OF THE INVENTION

The present invention relates to a printer control system compatible with data processing units using different protocols.

BACKGROUND OF THE INVENTION

Various pieces of information such as control and image data are transmitted between a host system implemented by a data processing unit and an input/output unit implemented by, for example, a printer apparatus in an information processing equipment such as a computer. The transmission of data between such a host system and an input/output unit is dictated by a communications protocol which consists of rules and formats governing the communication of data therebetween. In order that the host system and input/output unit operate on such a communications protocol, the protocol must be decipherable by both the host system and the input/output unit. In this instance, it is an ordinary practice that the protocol for the input/output unit be determined or selected to conform to that workable in the host system and, for this reason, a printer apparatus which is typical of the input/output unit is designed for exclusive use with the host system. If a protocol incompatible with that used in the host system is to be adopted for an input/output unit, the input/output unit is required to be equipped with any protocol converter to convert the protocol of the host system into the protocol used in the input/output unit.

A representative example of such a protocol converter has incorporated therein a program by means of which the control data output from the host system is to be converted into corresponding data operable in the input/output unit. The program conversion program, or emulation software program, is activated by a control data processor provided in the input/output unit. In an input/output unit using such a control data processor, it is also required that the control data once converted from the protocol of the host system be further converted into the form of internal parameters effective to control the various modes and phases of operation of the printer apparatus.

In a printer apparatus for use in an information processing equipment such as a computer is ordinarily provided a function with which prescribed alphanumerical letters and graphical patterns are to be printed when a particular one of the keys on a control panel is depressed by the operator of the apparatus.

When a test printing mode of operation is selected in a prior-art printer apparatus of this type and the printer apparatus is in operation on an emulation software program, printing operation is performed in similar manners as those which are followed when the printer apparatus operates on the protocol specific to the apparatus. However, when the printer apparatus is in operation on an emulation software program, it is sometimes desirable that information peculiar to the emulation software program be reproduced on the software program. Such a demand can not be satisfied in a printer control system which has been developed for use in a conventional printer apparatus having a test printing function.

SUMMARY OF THE INVENTION

It is accordingly an important object of the present invention to provide a printer control system for use in a printer apparatus having a test printing function and featuring the arrangement in which the information to be reproduced during test printing mode of operation is supplied from an external data processor unit and is thus made peculiar to the emulation software program for use in the test printing mode of operation.

In accordance with one outstanding aspect of the present invention, there is provided an image reproducing apparatus for reproducing on a record medium an image corresponding to image data supplied from a data supply device, comprising a) image recording means for forming a visible image on a record medium, b) memory means for storing a plurality of different process programs each for activating the image recording means, c) program selecting means responsive to an instruction signal from the data processing device for selecting any one of the different process programs, and d) control means for controlling the image recording means in accordance with the selected process program for enabling the recording means to reproduce on the record medium an image corresponding to the image data supplied from the data processing device.

In accordance with another outstanding aspect of the present invention, there is provided in an image reproducing apparatus including image recording means for forming a visible image on a record medium, memory means for storing a plurality of different process programs each for controlling the operation of the image recording means, and control means for controlling the image recording means in accordance with a selected one of the process programs for enabling the recording means to reproduce on the record medium an image corresponding to the image data supplied from a data processing device, a method comprising the steps of a) decoding the instruction signal from the data processing device, b) selecting any one of the different process programs on the basis of the decoded instruction signal, and c) controlling the image recording means in accordance with the selected process program for enabling the recording means to reproduce on the record medium an image corresponding to the image data supplied from the data processing device.

In accordance with still another outstanding aspect of the present invention, there is provided an image reproducing apparatus for reproducing on a record medium an image corresponding to image data supplied from a data supply device, comprising a) image recording means for forming a visible image on a record medium, b) memory means having a plurality of data storage areas, c) memory control means for loading different process programs into the data storage areas, respectively, each of the process programs being operable for activating the image recording means, d) program selecting means responsive to an instruction signal from the data processing device for selecting any one of the different process programs, and e) control means for controlling the image recording means in accordance with the selected process program for enabling the recording means to reproduce on the record medium an image corresponding to the image data supplied from the data processing device.

In accordance with still another outstanding aspect of the present invention, there is provided in an image reproducing apparatus including image recording means for forming a visible image on a record medium, memory means having a plurality of data storage areas, and control means for controlling the image recording means to reproduce on the record medium an image corresponding to the image data supplied from a data processing device, a method comprising the steps of a) storing different process programs into the data storage areas of the memory means, respectively, each of the process programs being operable for activating the image recording means, b) decoding an instruction signal supplied from the data processing device, b) selecting any one of the different process programs on the basis of the decoded instruction signal, and c) controlling the image recording means in accordance with the selected process program for enabling the recording means to reproduce on the record medium an image corresponding to the data supplied from the data processing device, d) selecting any one of the different process programs on the basis of the instruction signal from the data processing device, and e) controlling the image recording means in accordance with the selected process program for enabling the recording means to reproduce on the record medium an image corresponding to the data supplied from the data processing device.

BRIEF DESCRIPTION OF THE DRAWINGS

The features and advantages of a printer control system according to the present invention will be more clearly understood from the following description taken in conjunction with the accompanying drawings in which:

FIG. 7A is a block diagram showing the segment configuration of a portion of a system RAM unit forming part of the bit-map control circuit shown in FIG. 5;

FIG. 7B is a block diagram showing the configuration of a memory space forming a current process status (CPS) block provided in the work area of the system RAM unit;

FIGS. 18A, 18B and 18C are flowcharts showing the details of the data processing subroutine program further included in the host process program shown in the flowcharts of FIGS. 15A and 15B;

DESCRIPTION OF THE PREFERRED EMBODIMENT

Figure 1:
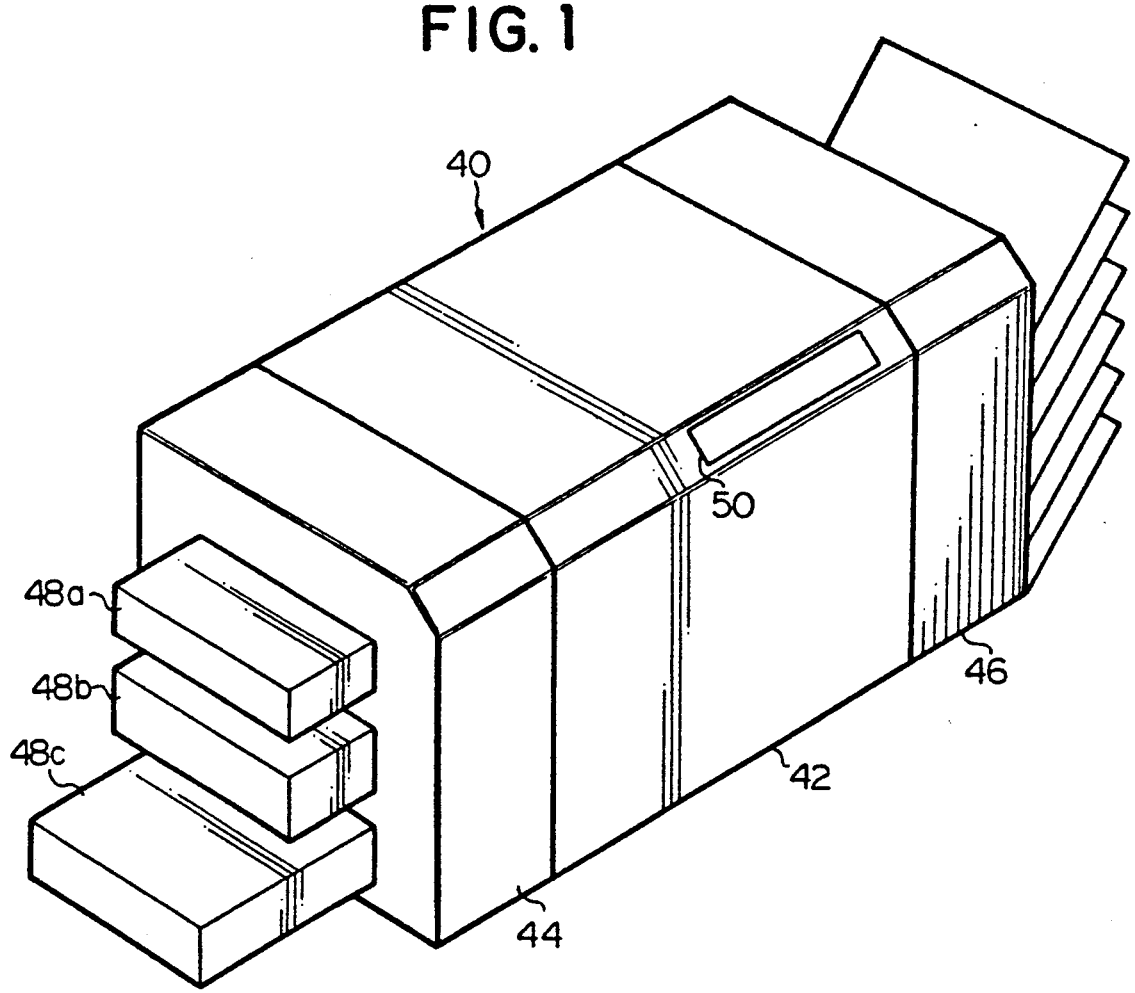
FIG. 1 is a schematic perspective view showing the general external construction of a printer apparatus into which a printer control system according to the present invention may be incorporated.

FIG. 1 shows the general external construction of a printer apparatus 40 into which a printer control system according to the present invention may be incorporated. As shown, the printer apparatus 40 is herein assumed to largely consist of a print engine module 42 which may be implemented by a known electrophotographic image reproducing system provided with a record medium supply module 44 and a print output module 46. The record medium supply module 44 may be typically implemented by a print sheet feed unit of an ordinary image duplicating apparatus, and the print output module 46 is shown represented by a page sorter unit. The print sheet feed unit implementing the record medium supply module 44 is shown to be of the type using detachable print sheet supply cassettes 48a, 48b and 48c by way of example. The print output module 46 is typically implemented by a page sorter assembly. The printer apparatus 40 may further have provided on the print engine module 42 a control panel 50, the key and indicator configuration of which is illustrated in FIG. 2.

Figure 2:
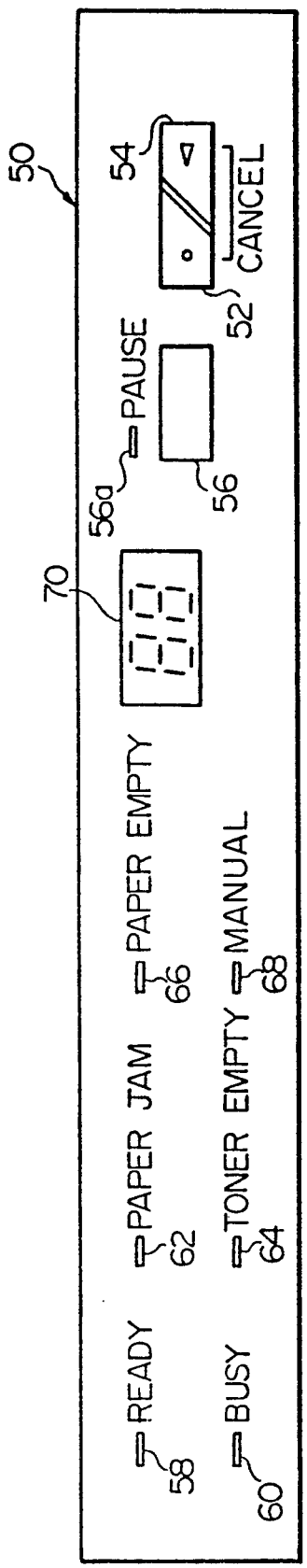
FIG. 2 is a plan view showing an example of the key and indicator configuration of a control panel which may form part of the printer apparatus illustrated in FIG. 1.

Referring to FIG. 2, the control panel 50 of the printer apparatus 40 comprises various control keys which include a test print start key 52, a shift key 54 and a print pause key 56. The test print start key 52 is used to start test printing operation when the key 52 alone is depressed. When the test print start key 52 is depressed with the shift key 54 depressed concurrently, the test print operation which has once been started is interrupted or a request for such operation is cancelled. The test print operation once started can also be interrupted with the print pause key 56 depressed after the test print start key 52 is depressed. When the print pause key 56 is depressed, an associated indicator 56a is turned on to illuminate. On the control panel 50 are further provided indicators which include an indicator 58 to indicate that the apparatus 40 is in a condition ready for printing operation, an indicator 60 to indicate that the apparatus 40 is in a condition busy in printing operation, and an indicator 62 to indicate that jamming of print sheet is caused within the apparatus 40 during printing operation. The indicators on the control panel 50 further include an indicator 64 to indicate that there is no storage of developer agent such as toner in the apparatus 40, an indicator 66 to indicate that there is no storage of record medium such as print sheet in any of the print sheet supply cassettes 48a, 48b and 48c, and an indicator 68 to indicate that a manual print sheet feed mode is established in the printer apparatus 40. Each of these indicators 56a and 58 to 68 may be implemented by a light emitting diode (LED). On the control panel 50 is further provided a seven-segment type numerical display window 70 for indicating the selected number of prints to be output for a single printing operation. The key and indicator configuration of the control panel 50 herein shown is simply for purposes of illustration and is not limitative of the functions available in a printer apparatus to which a printer control system according to the present invention is applicable.

Figure 3:
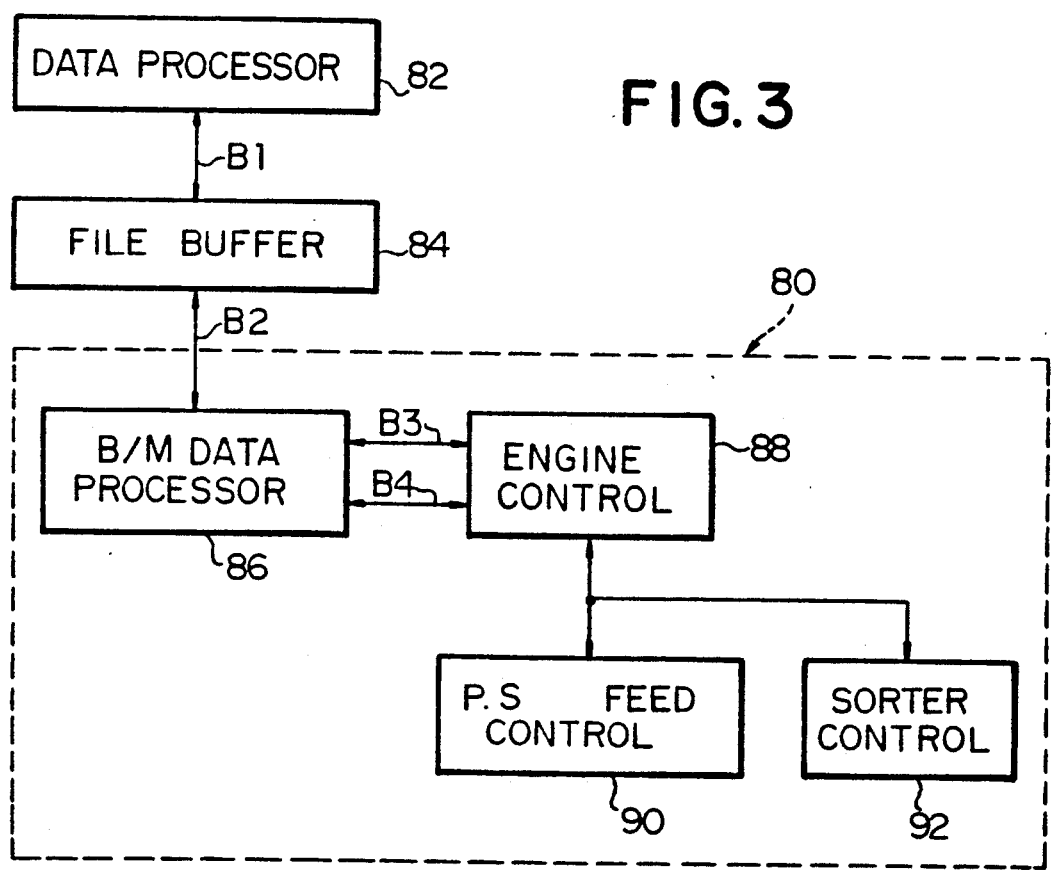
FIG. 3 is a block diagram showing the general arrangement of a printer control system embodying the present invention as coupled, with a standard data processor unit.

FIG. 3 shows the general arrangement of a printer control system embodying the present invention. The printer control system, generally represented by reference numeral 80, is coupled with a standard data processor unit 82 preferably through a file buffer circuit 84 by way of buses B1 and B2. From the data processor unit 82 herein used is to be supplied data including those representative of a graphic image and those representative of the program in accordance with which the image is to be reproduced and printed in the printer apparatus 40 under consideration. Such data is output from the data processor unit 82 in accordance with prescribed rules and formats which form a particular data communications protocol.

The data processor unit 82 shown forming part of the printer control system under consideration is assumed to be one of the various data processor units having different communications protocols, respectively. The communications protocol, $P_u$, adopted by the particular data processor unit 82 governs the transmission of data from the data processor unit 82 to the printer control system 80. In the description to follow, the communications protocol $P_u$ used in the data processor unit 30 which acts as the "user" of the printer apparatus under consideration will be referred to as user protocol. In contrast to such a user protocol $P_u$, the communications protocol, $P_h$, workable in the printer apparatus under the control of the data processor unit 82 will be referred to as host protocol.

The data thus supplied from the data processor unit 82 through the bus B1 is once stored in the file buffer circuit 84 and is thereafter supplied through the bus B2 to the printer control system 80, particularly to a bit-map data processing network 86 which forms part of the printer control system 80. The printer control system 80 comprises, in addition to the data processing network 86, a print engine control network 88 which communicates with the data processing network 86 by way of a control data bus B3 or through an image data bus B4 as shown. The print engine control network 88 in turn is connected to a print sheet feed driver circuit 90 to drive the print sheet feed unit implementing the record medium supply module 44, and a page sorter driver circuit 92 to drive the page sorter which represents the print output module 46 of print engine module 42 of the printer apparatus 40 embodying the present invention. The detailed configurations of preferred examples of the bit-map data processing network 86 and print engine control network 88 are depicted in FIG. 4.

Figure 4:
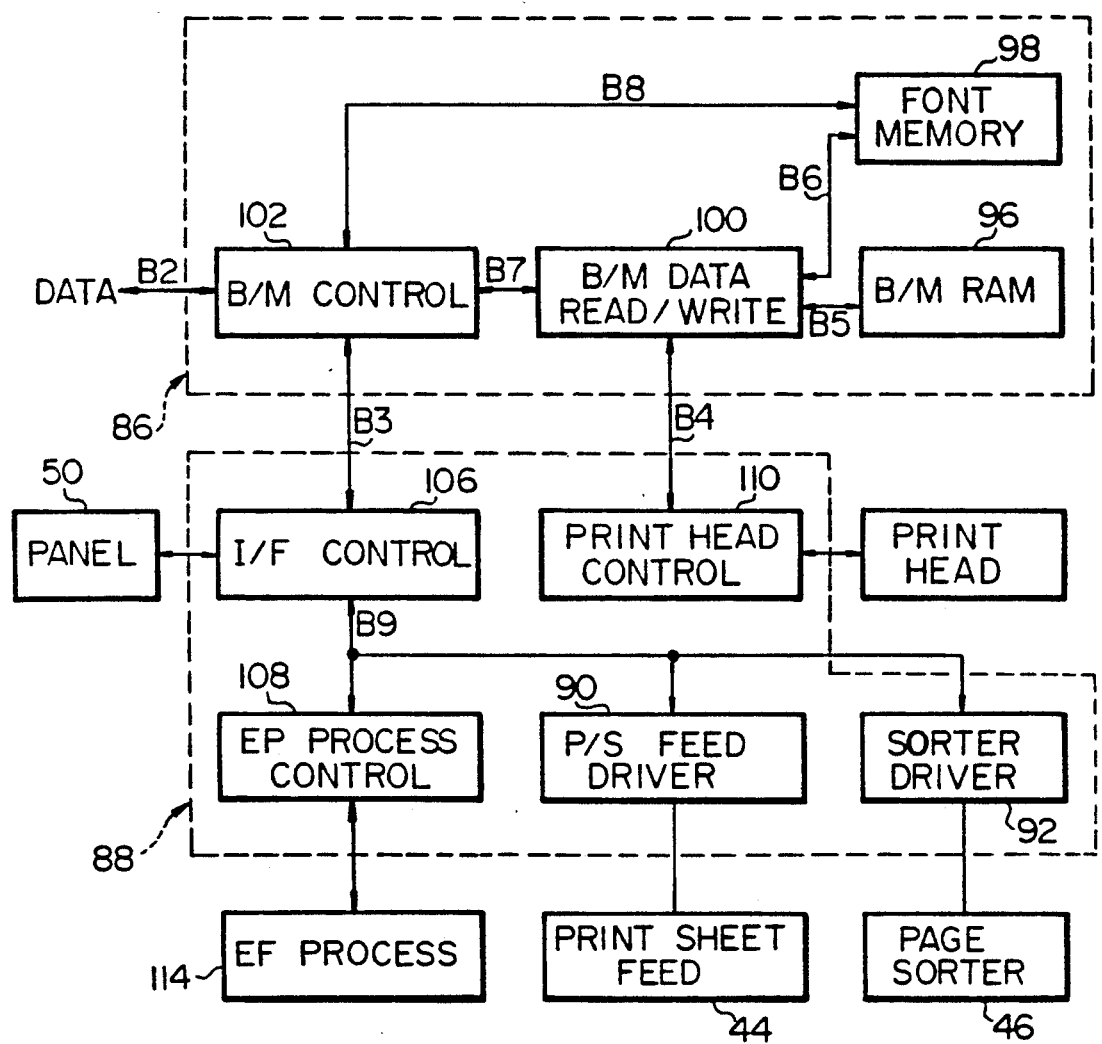
FIG. 4 is a block diagram showing the detailed configurations of preferred example of the data processing and print engine control networks incorporated in the printer control system illustrated in FIG. 3.

Referring to FIG. 4, the bit-map data processing network 86 comprises memory means including a bit-map memory unit 96 typically implemented by a random-access memory (RAM) for storing image information and a font memory unit 98 which has a collection of alphanumerical and graphic font data fixedly stored therein. The data processing network 86 further comprises a bit-map data read/write circuit 100 connected through a bus B5 to the bit-map memory unit 96 and through a bus B6 to the font memory unit 98, and a bit-map control circuit 102 connected through a bus B7 to the bit-map data read/write circuit 100. The bit-map data read/write circuit 100 is operative to read font data from the font memory unit 98 through the bus B6 and load the font data as bit-map graphic data into the bit-map memory unit 96 by way of the bus B5 under the control of the bit-map control circuit 102. The bit-map control circuit 102 is responsive to the control and image data from the file buffer circuit 84 through the bus B2 and and controls the operation of the bit-map data read/write circuit 100 through the bus B7. The bit-map control circuit 102 is connected to the font memory unit 98 through a bus B8.

Upon receipt of the control and image data from the file buffer circuit 84 through the bus B2, the bit-map control circuit 102 outputs intermediate code signals, on the basis of which the bit-map memory unit 96 or the font memory unit 98 is accessed at any addresses thereof through the bit-map read-write circuit 100 and by way of the bus B5 and B6, respectively, as will be described in more detail.

On the other hand, the print engine control network 88 comprises three major control circuits which consist of an interface control circuit 106, an electrophotographic process control circuit 108, and a print head control circuit 110.

The interface control circuit 106 is provided to process the control data received from the bit-map control circuit 102 through the control data bus B3. The interface control circuit 106 is connected through a bus B9 to the control panel 50 described with reference to FIG. 2 and, on the basis of the control data received from the bit-map control circuit 102, controls the selective activation of the indicators 56a and 58 to 68 and display window 70 on the control panel 50. The interface control circuit 106 is further operative to control the timings at which the various functional units and elements incorporated in the print engine module 42 shown in FIG. 1 are to be activated and de-activated. Such timings are controlled by signals transmitted through an internal bus B10 in the print engine control network 88.

The electrophotographic process control circuit 108 is responsive to the control data supplied from the interface control circuit 106 through the internal bus B10 and dictates the operation of an electrophotographic image processing stage 114 incorporated in the print engine module 42 of the printer apparatus 40. An electrophotographic image processing stage of a printer apparatus is per se well known in the art and for this reason will not be herein described to avoid prolixity of description.

The print head control circuit 110 is responsive to the image data supplied from the bit-map data read/write circuit 100 through the data bus B4 and dictates the operation of a print head 116 also incorporated in the print engine module 42. The print head 116 incorporated in the print engine module 42 of the printer apparatus 40 under consideration is assumed to be of the laser type by way of example and, thus, the print head control circuit 110 herein provided is operative to control the activation of, for example, a semiconductor laser generator and an associated polygonal-mirror drive motor, though not shown in the drawings. The interface control circuit 106 is further connected through the internal bus B10 of the network 88 to the print sheet feed and sorter driver circuits 90 and 92. The print sheet feed and sorter driver circuits 90 and 92 are thus actuated under the control of the interface control circuit 106 to drive the print sheet feed unit implementing the record medium supply module 44 and the page sorter included in the print output module 46 of the print engine module 42.

Figure 5:
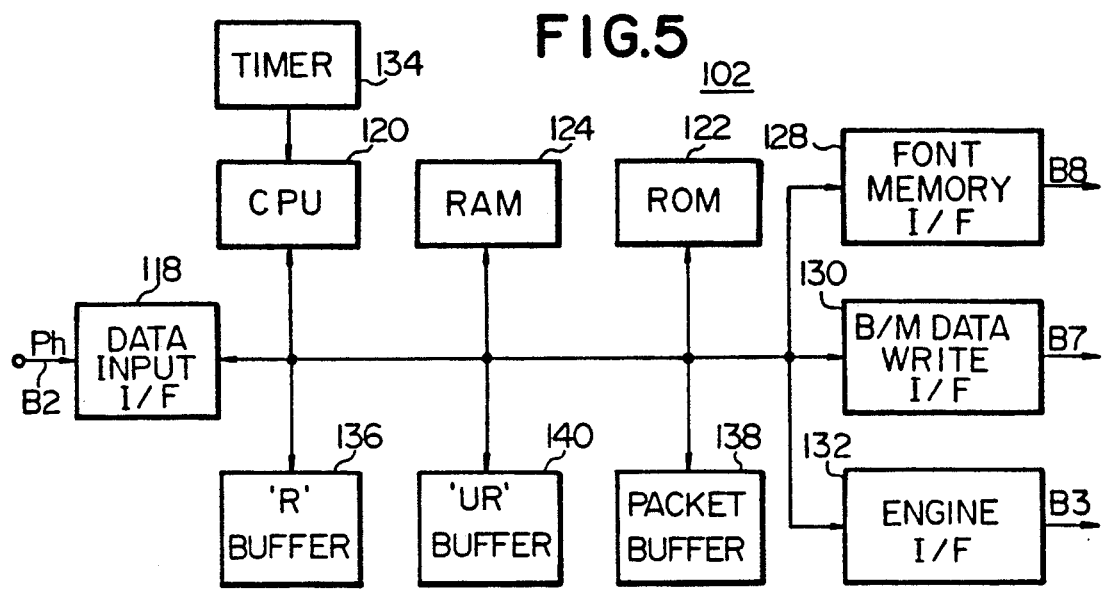
FIG. 5 is a block diagram showing the schematic circuit arrangement of a preferred example of the bit-map control circuit which forms part of the bit-map data processing network illustrated in FIG. 4.

FIG. 5 shows the schematic circuit arrangement of a preferred example of the bit-map control circuit 102 which thus forms strategic part of the bit-map data processing network 86. As shown, the bit-map control circuit 102 comprises a data input interface section 118 connected through the file buffer circuit 84 to the data processor unit 82 (FIG. 3). The bit-map control circuit 102 further comprises a central processing unit 120, a system read-only memory (ROM) unit 122 and a system RAM unit 124, which are coupled together by a common bus 126 extending from the data input interface section 118 to separate output interface sections. These output interface sections consist of a font memory interface section 128 connected to the font memory unit 98 through the bus B8, a data write interface section 130 connected to the bit-map data read/write circuit 100 through the bus B7, and a print engine interface section 132 connected to the interface control circuit 106 of the print engine control network 88 through the control data bus B3. An interrupt may be periodically generated in the central processing unit 120 under the control of by a timer circuit 134 which supplies a train of interrupt signals to the central processing unit 120.

The bit-map control circuit 102 further comprises a buffer arrangement connected through the common bus 120 to the system RAM unit 124. As shown, the buffer arrangement comprises an "R" or data-latch buffer register 136 for storing the data introduced into the bit-map control circuit 102 through the data input section 118 of the control circuit 102. The data thus stored into the "R" or data-latch buffer register 136 is transferred by way of the common bus 120 directly to a packet buffer register 138 if the user protocol $P_u$ governing the transmission of the data from the data processor unit 80 is determined to be per se workable in the printer control system 80. If the user protocol $P_u$ adopted by the data processor unit 80 is found to be per se unworkable in the printer control system 80, the data received from the data processor unit 80 and once stored in the "R" or data-latch buffer register 136 is passed through a "UR" or user data-latch buffer register 140 to the packet buffer register 138 after the user protocol $P_u$ dictating the data received is converted into the host protocol $P_h$ workable in the printer control system 80 under consideration. The data thus passed to the data-latch buffer register 136 or to the user data-latch buffer register 140 is re-formulated into packets each composed of function-type intermediate code signals before the data is transferred to the packet buffer register 138.

Figure 6:
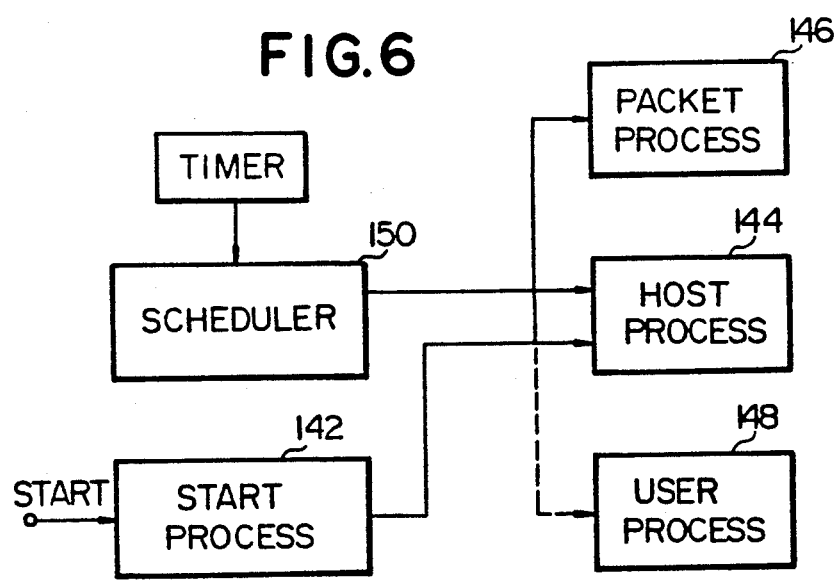
FIG. 6 is a block diagram schematically showing the general software architecture of the system ROM (read-only memory) unit incorporated in the bit-map control circuit illustrated in FIG. 5.

FIG. 6 schematically shows the general software architecture of the system ROM unit 122 included the bit-map control circuit 102 arranged as hereinbefore described. As illustrated, the ROM unit 122 has stored therein a start process program 142, a host process program 144 and a packet process program 146. Represented by a block in broken lines as at 148 is a user process program 148 which may be stored in the system RAM unit 124.

The host process program 144 is used for reading the data from either the "R" or data-latch buffer register 136 or from the "UR" or user data-latch buffer register 138 and editing the data into the form of packets for storage into the packet buffer register 138. The data packets thus stored into the packet buffer register 138 are analyzed in accordance with the packet process program 146 to access the font memory unit 98 at any addresses of the memory unit through the font memory interface section 128. In addition, the data packets stored into the packet buffer register 138 are transmitted from the packet buffer register 138 to the bit-map data read/write circuit 100 by way of the data write interface section 130, and through the print engine interface section 132 to the interface control circuit 106 of the print engine control network 88. Upon receipt of such data, the bit-map data read/write circuit 100 controls access to the bit-map memory unit 96 to read data from the memory unit 96 at any addresses thereof.

On the other hand, the user process program 148 loaded into the system RAM unit 124 is used for the conversion of the user protocol $P_u$ governing the data passed from the "R" or data-latch buffer register 136 to the "UR" or user data-latch buffer register 140. The principle on the basis of which such conversion is to be made will become apparent as the description proceeds.

The start process program 142 is executed to initialize the system data processor and all the memories, buffers and registers of the control system when the printer apparatus 40 is switched in. When the start process program 142 is executed, the host process program 144, packet process program 146 and user process program 148 are accessed successively in accordance with a prescribed order of priority dictated by a scheduler 150. The scheduler 150 also forms part of the system ROM unit 122 and is responsive to the interrupt signals supplied from the timer circuit 134 to the central processing unit 120.

FIG. 7A shows the segment configuration of a portion of the memory area of the system RAM unit 124 also forming part of the bit-map control circuit 102 (FIG. 5) of the data processing network 86. The system RAM unit 124 has a download or first-in first-out (FIFO) segment $S_1$ into which the user process program 148 is to be loaded. The system RAM unit 124 further has memory areas $S_2$ to $S_4$ to store data read from the packet buffer register 140 ($S_2$) data-latch buffer register 136 (area $S_3$), user data-latch buffer 138 ($S_4$), respectively, a system work area $S_5$, and an interrupt vector table area $S_6$.

Turning to FIG. 7B, the system RAM unit 124 has with the system work area a memory space forming a current process status block (CPS). The current process status block CPS has a plurality of data retract areas which are shown including those retract areas $A_1$, $A_2$ and $A_3$ assigned to the host process program 146, packet process program 144, and user process program 148, respectively. The host, packet or user process program 144, 146 or 148 loaded into the central processing unit 120 may be withdrawn independently of each other into any of these retract areas $A_1$, $A_2$ and $A_3$ of the system RAM unit 124 so that any of these process programs 144, 146 and 148 can be executed independently of the others.

Into the system RAM unit 124 may be further stored the data supplied from the data processor unit 82 through the file buffer circuit 84 and data input interface section 118, or the data read from the font memory unit 98 and supplied through the font memory interface section 128. The user process program 148 is thus useful for processing not only the data supplied from the data processor unit 82 but also the data read from the font memory unit 98. Such processing of the data from the data processor unit 82 or the font memory unit 98 is effected also in a priority order dictated by the scheduler 150 included in the system ROM memory unit 122. As has been noted, the user process program 148 stored in the font memory unit 98 and loaded into the system RAM unit 124 is used so that the data which has been transmitted with any user protocol incompatible with the host protocol $P_h$ used in the printer apparatus 40 under consideration is converted into the host protocol $P_h$ used in the printer apparatus 40. Thus, the data transmitted with the user protocol $P_u$ unworkable in the printer apparatus 40 is first temporarily stored into the "R" or data-latch buffer register 136 (FIG. 5) and, upon conversion of the user protocol $P_u$ in accordance with the user process program 148, transferred to the "UR" or user data-latch buffer register 140 via a data stream indicated by broken lines in FIG. 8. In these manners, the packet buffer register 138 receives data either directly from the "R" or data-latch buffer register 136 without activating the user process program 148 or by way of the "UR" or user data-latch buffer register 140 upon activation of the user process program 148 for conversion of the protocol $P_h$ in the supplied data. No substantial change or modification in the host process program 144 per se is thus necessitated in processing data into packets if the data is received directly from the "R" or data-latch buffer register 136 or by way of the "UR" or user data-latch buffer register 140. Data transmitted with any user protocol $P_u$ differing from that used in the printer apparatus 40 under consideration can be properly processed by the host process program 144 possibly with a slight modification of the user protocol made in the user process program 148. It may be further noted that no other process programs predominant over the various processes for printing operation need be changed or modified depending upon the user protocol $P_u$ used in the data processor unit to be used in combination with the printer apparatus 40. For this reason, the user process program 148 may be formulated simply in such a manner as to be capable of converting any given user communications protocol into the host protocol $P_h$ workable in the printer apparatus 40 without processing the supplied data per se.

As will be understood from the foregoing description, the user process program 148 to be loaded into the download or FIFO segment $S_1$ of the memory area of the system RAM unit 124 may be the program supplied from the data processor unit 82 through the data input section 118 or from the font storage memory unit 98 (which may be provided in the form of a package in a plug-in cartridge, not shown) through the font memory interface section 128 and is loaded and stored into the FIFO segment $S_1$ of the RAM unit 124. The data for the user program thus stored in the FIFO segment $S_1$ of the system RAM unit 124 is processed through time sharing with other process programs. By execution of this user process program 148, the user protocol $P_u$ governing the data transmitted to the printer apparatus 40 under consideration is to be converted into the host protocol $P_h$ if the user protocol $P_u$ differs from the host protocol $P_h$. In this instance, the data stored into the "R" or data latch buffer register 136 through the data input interface section 118 and having the user protocol $P_u$ different from the host protocol $P_h$ is fetched from the buffer register 136 and the user protocol $P_u$ governing the data is converted into the host protocol $P_h$ through execution of the user process program 148 and is transferred to the "UR" or user data latch buffer 140. The data thus expressed in accordance with the host protocol $P_h$ is transferred to the "UR" or user data latch buffer register 140 and is thereafter fetched from the buffer register 140.

Figure 8:
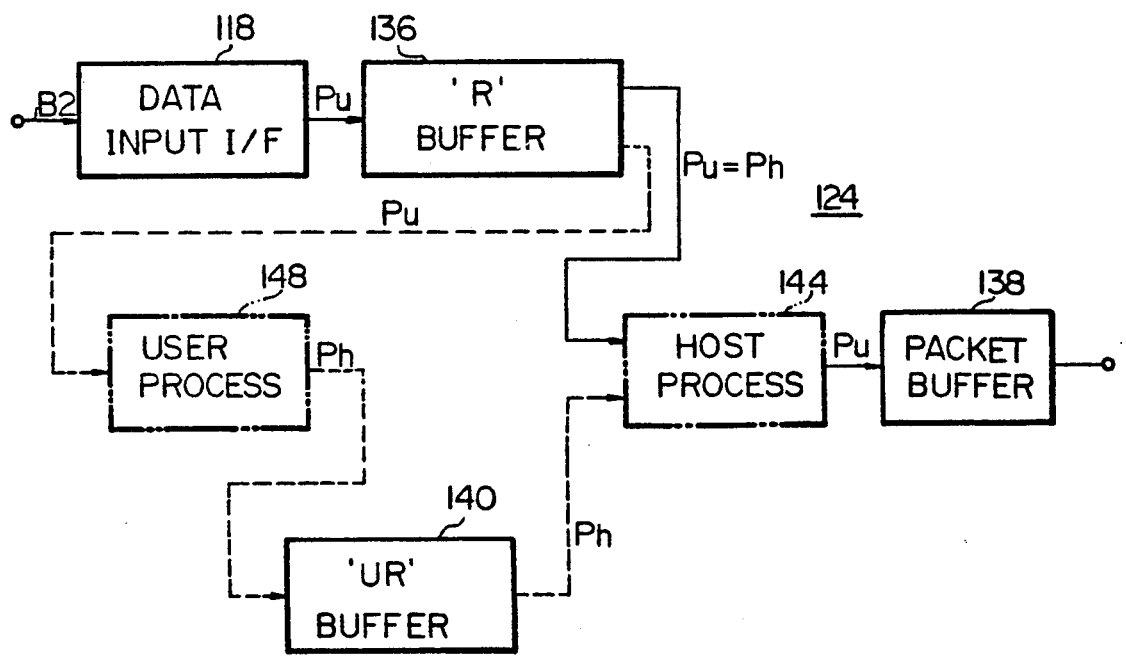
FIG. 8 is a block diagram showing the general schemes in accordance with which data is to be transferred, either directly or on conversion of the user protocol to the host protocol, from the data latch buffer register to the packet buffer register in the bit-map control circuit illustrated in FIG. 5.

The data expressed in the host protocol P is fetched either directly from the "R" or data patch buffer register 136 as indicated by full lines in FIG. 8 or, on execution of the user process program 148, from the "UR" or user data latch buffer register 138 as indicated by broken line in FIG. 8. The data is edited into the form of packets for storage into the packet buffer register 138 through execution of the host process program 144, whereupon the packet data is stored into the packet buffer register 138 for being analyzed in accordance with the packet process program 146.

Figure 9:
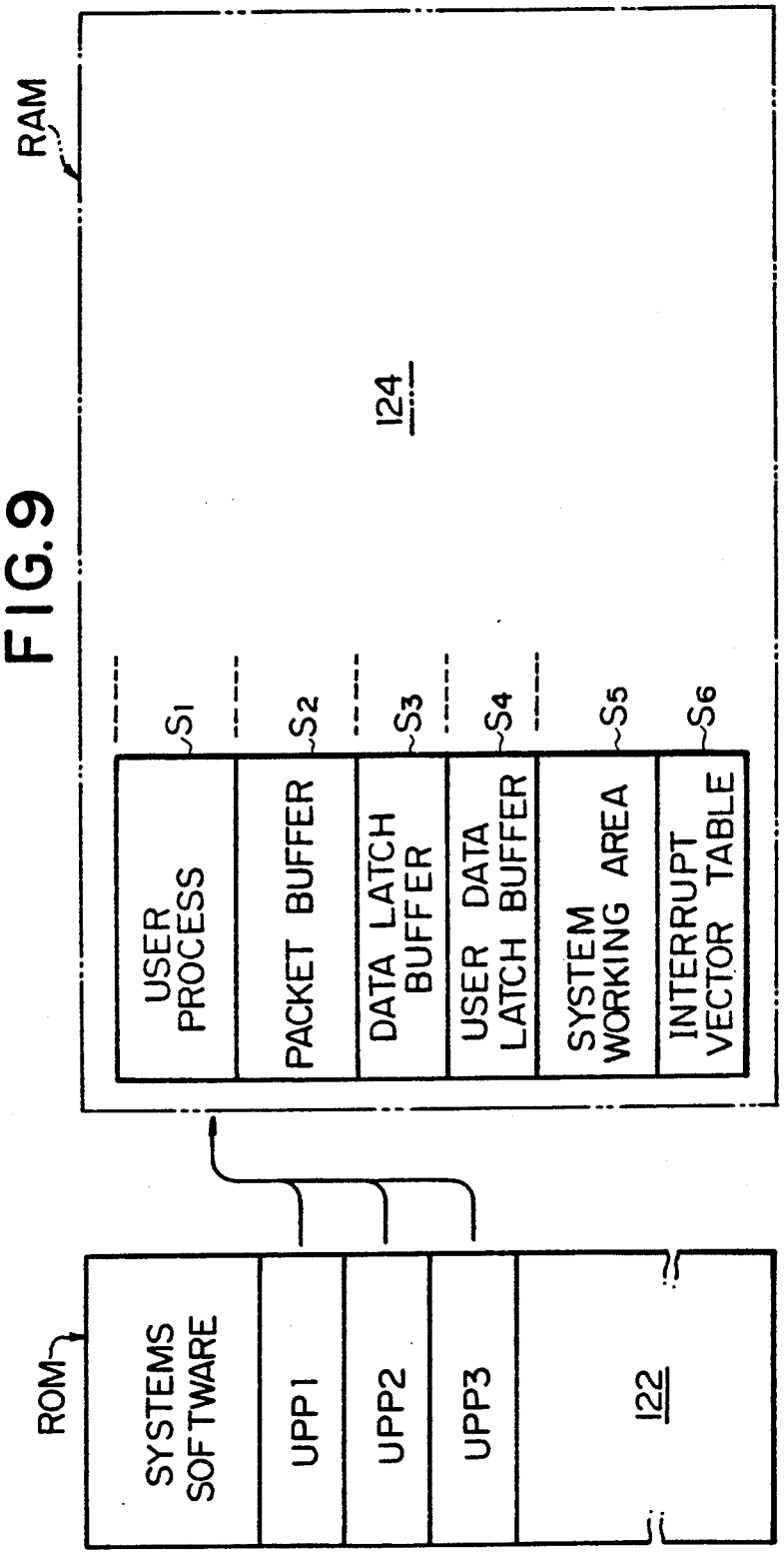
FIG. 9 is a diagram showing the general schemes in accordance with which a user process program is selected depending on a given user protocol from among those stored in a system ROM unit and is loaded into a system RAM unit in bit-map control circuit shown in FIG. 5.

The user process program 148 hereinbefore described is one of such programs UPP1, UPP2, UPP3, . . . which are provided for the different user protocols, respectively, that can be coped with by the bit-map control circuit 102. These different user process programs UPP1, UPP2, UPP3, . . . are stored in the system ROM unit 122 of the bit-map control circuit 102 (FIG. 5) of the data processing network 86 as shown in FIG. 9. Any one of the user process programs UPP1, UPP2, UPP3, . . . may be selectively fetched from the system ROM unit 122 depending on the user protocol $P_u$ designated by a user process designation code given by the data processor unit 82 and loaded into the FIFO segment $S_1$ of the system RAM unit 124 of the bit-map control circuit 102.

Figure 10:
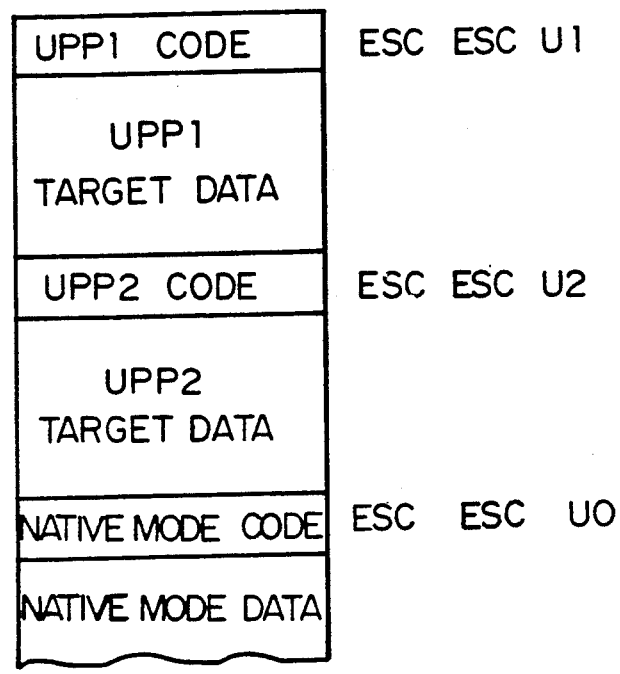
FIG. 10 is a fragmentary diagram schematically showing an example of a sequence of data included in the data to be supplied from an external data processor unit to the printer control system embodying the present invention.

FIG. 10 shows an example of a sequence of data included in the data to be supplied from the data processor unit 82 to the printer control system 80 embodying the present invention.

As shown, the sequence of data supplied from the data processor unit 82 includes a code "ESC ESC U1" specifying the user process program UPP1 followed by target data formated to conform to one user process program UPP1. The data sequence from the data processor unit 82 further includes a code "ESC ESC U2" specifying the user process program UPP2 followed by target data differing from the user process program UPP1 and now formated to conform to another user process program UPP2. The target data conforming to the user process program UPP2 is in turn followed by a code "ESC ESC U0" specifying the host process program 144 followed by "native" data formated to conform to the host process program 144. The printer control system 40 in receipt of the data thus formated and supplied from the data processor unit 82 is enabled to process the image data to reproduce images in the print engine module 42.

Figure 11:
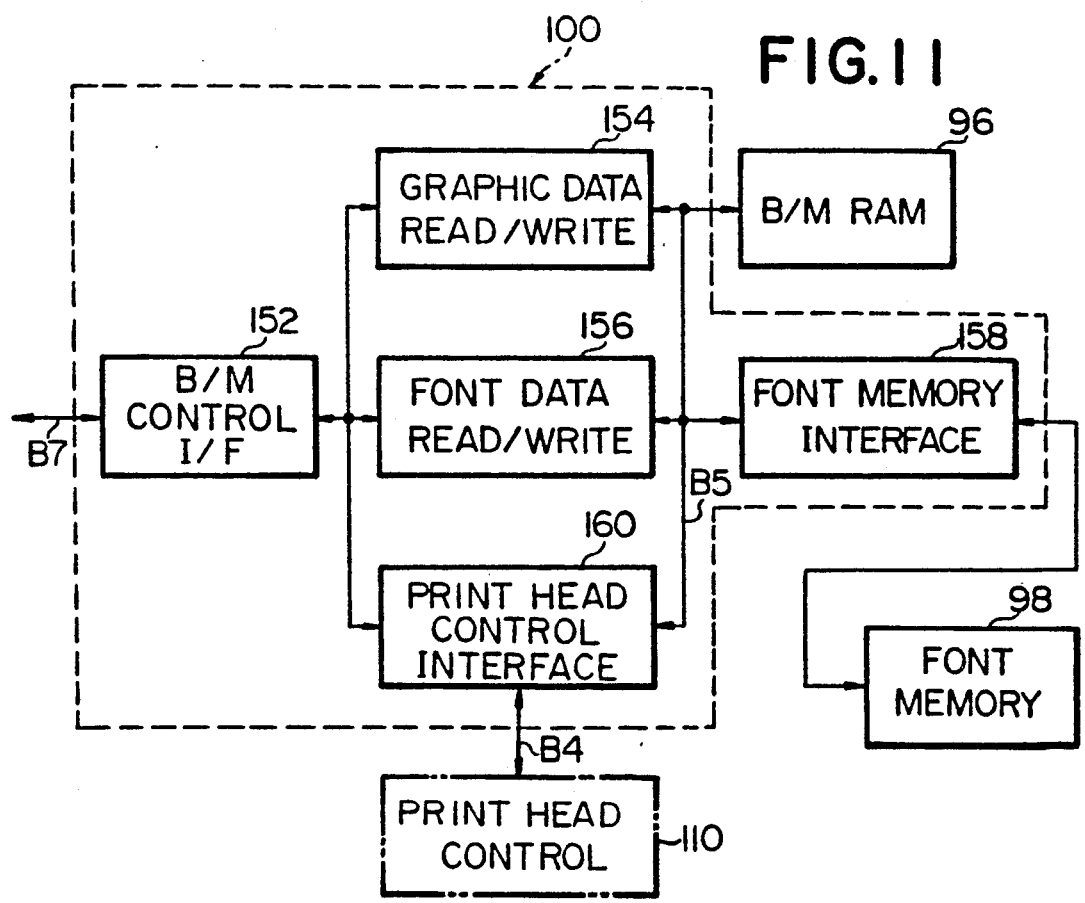
FIG. 11 is a block diagram showing an example of the detailed configuration of the bit-map data read/write circuit which forms part of the bit-map data processing network illustrated in FIG. 6.

FIG. 11 shows an example of the detailed configuration of the bit-map data read/write circuit 100 which forms part of the bit-map data processing network 88 described with reference to FIG. 4. The major functions of the bit-map data read/write circuit 100 of the bit-map data processing network 88 include a function to write image data into the bit-map memory unit 96 when such data is loaded into the apparatus 40. The bit-map data read/write circuit 100 has another function to read data from the bit-map memory unit 96 for transmission to the print engine control unit 36 (FIG. 1) through the bit-map control circuit 102 during printing operation. Thus, the bit-map data read/write circuit 100 comprises a bit-map control interface circuit 152 connected through the bus B7 to the bit-map control circuit 102 of the bit-map data processing network 88.

Data may be written into or read out of the bit-map memory unit 96 through a graphic data read/write control circuit 154 and/or a font data read/write control circuit 156. Each of these graphic and font image data read/write control circuits 154 and 156 is composed of a logic network connected through the bit-map control interface circuit 152 to the bit-map control circuit 102 and operates on intermediate code signals supplied from the bit-map control circuit 102. The graphic data read/write control circuit 154 is connected between the bit-map control interface circuit 152 and the bit-map memory unit 96 and controls the reading or writing of data representative of graphic features out of or into the bit-map memory unit 96. In controlling the writing of data into the bit-map memory unit 96, the read/write control circuit 154 processes the intermediate code signals received from the bit-map control circuit 102 mostly through analysis into such signals. On the other hand, the font data read/write control circuit 156 is connected between the bit-map control interface circuit 152 and font memory unit 98 through a font memory interface circuit 158 and controls the reading of alphanumerical data out of the font memory unit 98. In response to the intermediate code signals received from the bit-map control circuit 102, the read/write control circuit 156 reads data from the font RAM unit 98 and writes the data into the bit-map memory unit 96 without analyzing the intermediate code signals received from the bit-map control circuit 102.

The data read/write circuit 100 further comprises a print head control interface circuit 160 operative to read data from the bit-map memory unit 96 under the control of the print head control circuit 110 forming part of the print engine control network 88. The print head control interface circuit 160 is responsive to a print start code signal supplied from the bit-map control circuit 102 through the bit-map control interface circuit 152 and to a synchronizing signal supplied from the print head control circuit 110 through the graphic data bus B4. In response to such signals from the bit-map and print head control circuits 102 and 110, the print head control interface circuit 160 transmits to the print head control circuit 110 of the print engine control network 88 the data which has been read out from the bit-map memory unit 96.

Figure 12:
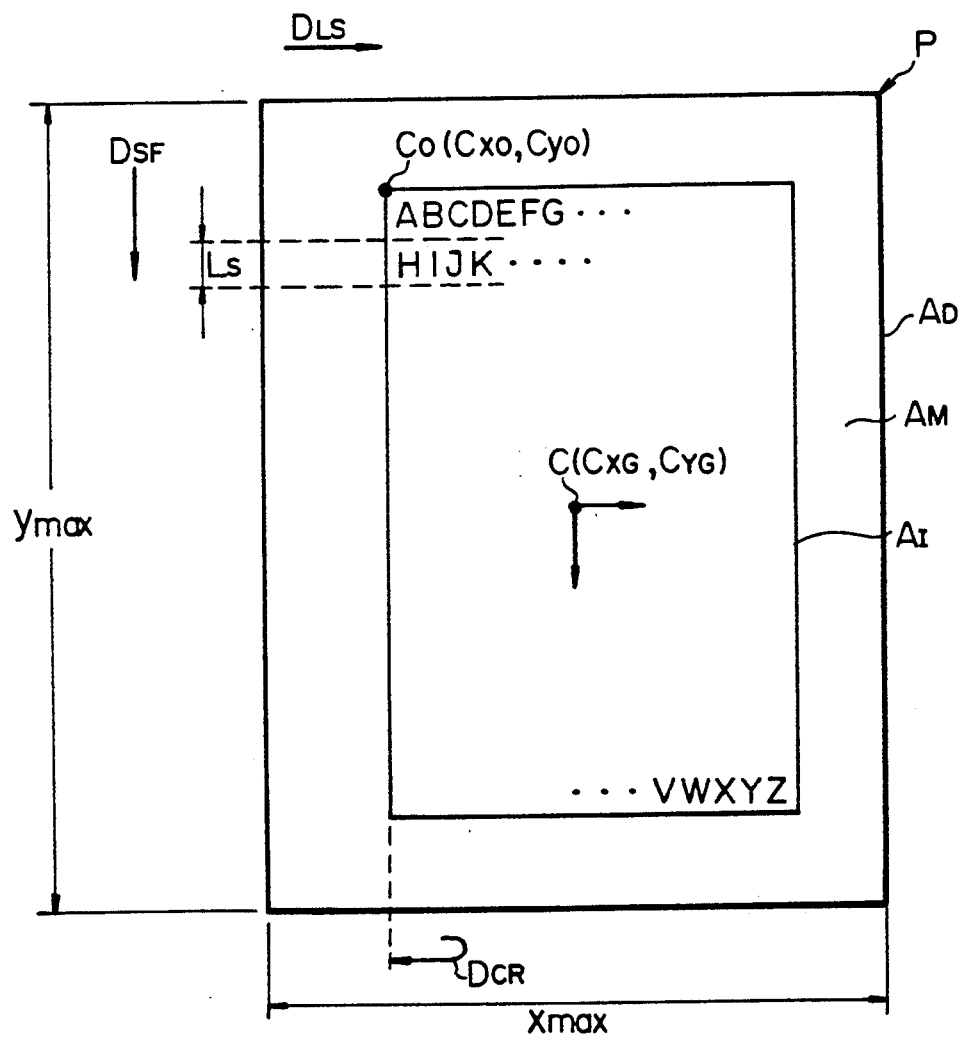
FIG. 12 is a plan view showing the total area of a sheet of paper which may be used as a record medium in a printer apparatus to which the present invention appertains.

FIG. 12 shows the total area of a print sheet P of paper which may be used as a record medium in a printer apparatus 40 to which the present invention appertains. The print sheet P has, within its total area, a print area $A_p$ surrounded by a margin area $A_m$ extending along a pair of parallel longitudinal ends and a pair of parallel lateral ends of the sheet P. When alphanumerical images are to be printed, the images are printed in horizontal lines renewed successively from the uppermost end of the print area $A_p$ downward as indicated by arrow a and each advancing from the leftmost end of the print area $A_p$ rightward as indicated by arrow b. When a change-of-line instruction signal is issued during printing of a line, the print position is moved a predetermined vertical distance $D_s$ from the particular line and, if a return-to-end-of-line instruction signal is then issued, the print position is further moved to the left end of the line to start printing along a new line spaced the distance $D_s$ from the last print line. The sizes of the margin area $A_m$ are determined on the basis of instructions from the data processor unit 82 and may be altered from one page or print sheet to another.

The mode of operation of the printer apparatus 40 incorporating the printer control system embodying the present invention thus constructed and arranged will now be described with reference to the flowcharts illustrated in FIGS. 13 to 28 of the drawings. As will have been understood from the foregoing description, the software architecture predominant over the operation of such a printer control system is largely broken down to the following three major categories:

(1) Host process program (144) which is to be activated to (a) read the data from either the "R" or data-latch buffer register 136 or from the "UR" or user data-latch buffer register 138 of the system RAM unit 124 (FIGS. 5 and 8), (b) analyze the data received from the "R" or data-latch buffer register 136 or the "UR" or user data-latch buffer register 138, (c) generates data in the form of packets from the data received from the "R" or data-latch buffer register 136 or the "UR" or user data-latch buffer register 138, and (d) store the data packets into the packet buffer register 138.

(2) Packet process program (146) which is to be activated to (a) analyze the data packets stored into the packet buffer register 138, (b) control access to the font memory unit 98 through the font memory interface section 128 to read data from the font memory unit 98 at any addresses thereof, (c) transmit data to the bit-map data read/write circuit 100 of the bit-map data processing network 86 through the data write interface section 130 to write data into the bit-map memory unit 96, and (d) transmit data to the interface control circuit 106 of the print engine control network 88 through the print engine interface section 132 to control the print sheet feed unit implementing the record medium supply module 44 and the page sorter included in the print output module 46 of the printer apparatus 40.

(3) User process program (148) which is to be activated if and when the user protocol $P_u$ dictating the data supplied from the data processor unit 82 differs from the host protocol $P_h$ used in the printer apparatus 40 so as to (a) convert the user protocol $P_u$ dictating the data stored into the "R" or data-latch buffer register 136 into the host protocol $P_h$ which can be analyzed by the host process program, and (b) transmit the data to the packet buffer register 138 via the "UR" or user data-latch buffer register 140 after the user protocol $P_u$ is converted into the host protocol $P_h$. This user process program 148 is provided by the data loaded from the font memory unit 98, system RAM unit 124 or data processor unit 82 and is not activated if the user protocol $P_u$ dictating the data supplied from the data processor unit 82 is acceptable in the printer apparatus 40.

As noted previously, the user process program 148 stored in the font memory unit 98 is useful for processing not only the data supplied from the data processor unit 82 but also the data read from the font memory unit 98 per se. These host process program 144, packet process program 146 and user process program 148 are accessed successively in accordance with a prescribed order of priority dictated by the scheduler 150 included in the system ROM unit 122. The scheduler 150 is responsive to the interrupt signals supplied from the timer circuit 134 to the central processing unit 120. For purposes of description, it is herein assumed that priority is placed on the packet, host and user process programs 146, 144 and 148 in this sequence.

Start Process Program

Figure 13:
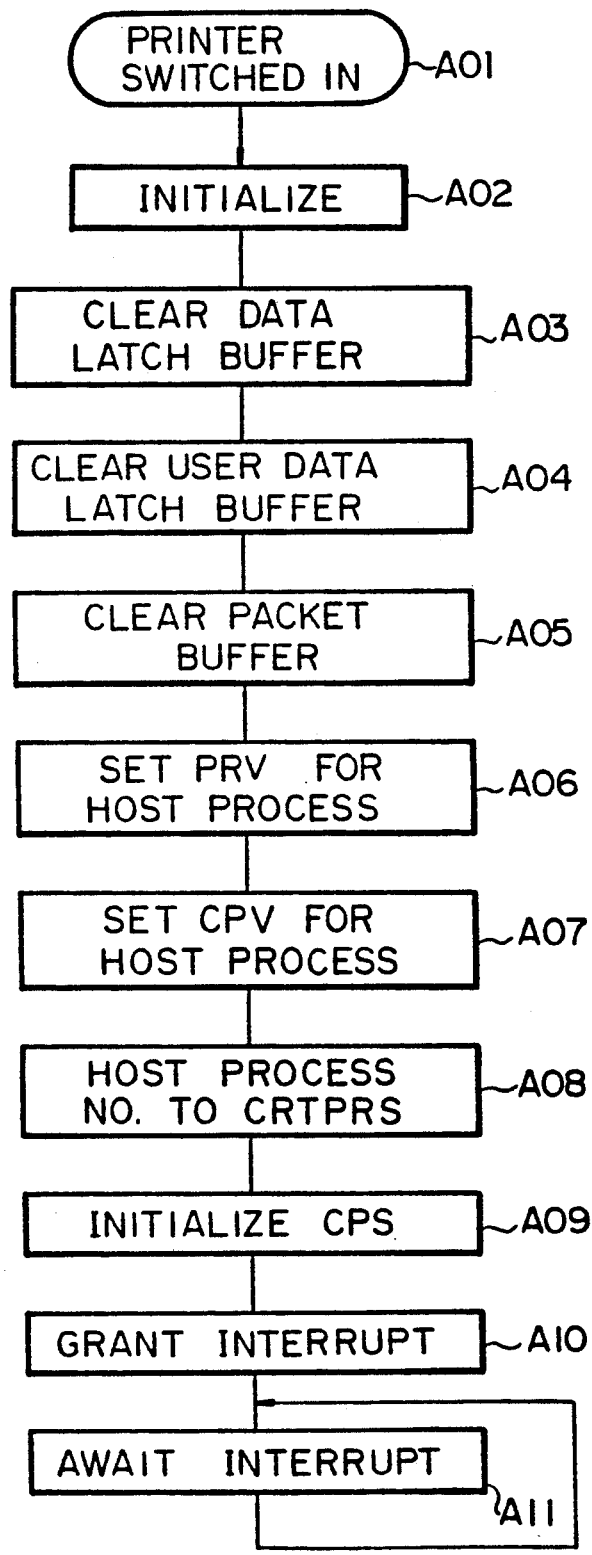
FIG. 13 is a flowchart showing the start process program stored in the system ROM included in the printer control system embodying the present invention.

FIG. 13 shows the start process program 142 stored in the system ROM unit 122 as hereinbefore described with reference to FIG. 6. The start process program 142 is executed to initialize the system central processing unit 120 and the peripheral units when the printer apparatus 40 under consideration is switched in. With the printer apparatus 40 thus switched in, the start process program 142 is started as at step A01 so that the system data processor and all the memories, buffers and registers associated with the data processor are initialized at step A02. The "R" or data-latch buffer register 136, "UR" or user data-latch buffer register 140 and packet buffer register 138 (FIG. 8) are also initialized so that the content of each of the buffer registers is cleared, at steps A03, A04 and A05, respectively.

The central processing unit 120 of the bit-map control circuit 102 then proceeds to step A06 at which the flag of a process request vector (PRV) is set for the host process program 144 and further to step A07 at which the flag bit of a current process vector (CPV) is set also for the host process program 144. The central processing unit 120 of the bit-map control circuit 102 further proceeds to step A08 at which the code number represented by a CRTPRS is switched to the number assigned to the host process program 144. The process request vector PRV is such that, when the scheduler 150 of the system ROM unit 122 is activated by timed interrupt from the central processing unit 120, the process request vector PRV informs the scheduler 150 that the request for the execution of the process program interrupted is cancelled and that any process program other than the interrupted program is to be activated in turn. Thus, the process request vector PRV has a flag which may be set for any of the host, packet and user process programs 144, 146 and 148. On the other hand, the current process vector CPV indicates the process program currently under execution and, when the scheduler 150 is activated by timed interrupt from the central processing unit 120, indicates the particular process program which is withdrawn from execution. For the CRTPRS is set numbers which are respectively assigned to the host, packet and user process programs 144, 145 and 146 and which are larger in the order of priority for execution. The CRTPRS indicates the number of the process program indicated by the current flag of the current process vector CPV.

The process request vector PRV, current process vector CPV and CRTPRS being thus set for the host process program 144 at steps A06, A07 and A08, respectively, the scheduler 150 included in the system ROM unit 122 determines the process program to be executed subsequently, viz., the host process program 144 under the current situations. The details of the program to be executed by the scheduler 150 for this purpose will be described later with reference to FIG. 14.

Upon completion of the steps A06, A07 and A08, the central processing unit 120 of the bit-map control circuit 102 proceeds to step A09 to initialize the current process status block CPS of the system RAM unit 124. A starting address is loaded into the memory area of the status block CPS storing the address pointers of the program to be executed by the central processing unit 120 and, in addition, appropriate initial addresses are further loaded into the current process status block CPS such as the memory area of the block storing stack pointers. When the current process status block CPS is thus initialized completely, the request for the timed interrupt is granted at step A10 whereupon the central processing unit 120 waits by way of a loop implemented by step A11 until the timed interrupt is received.

Scheduler Program

Figure 14:
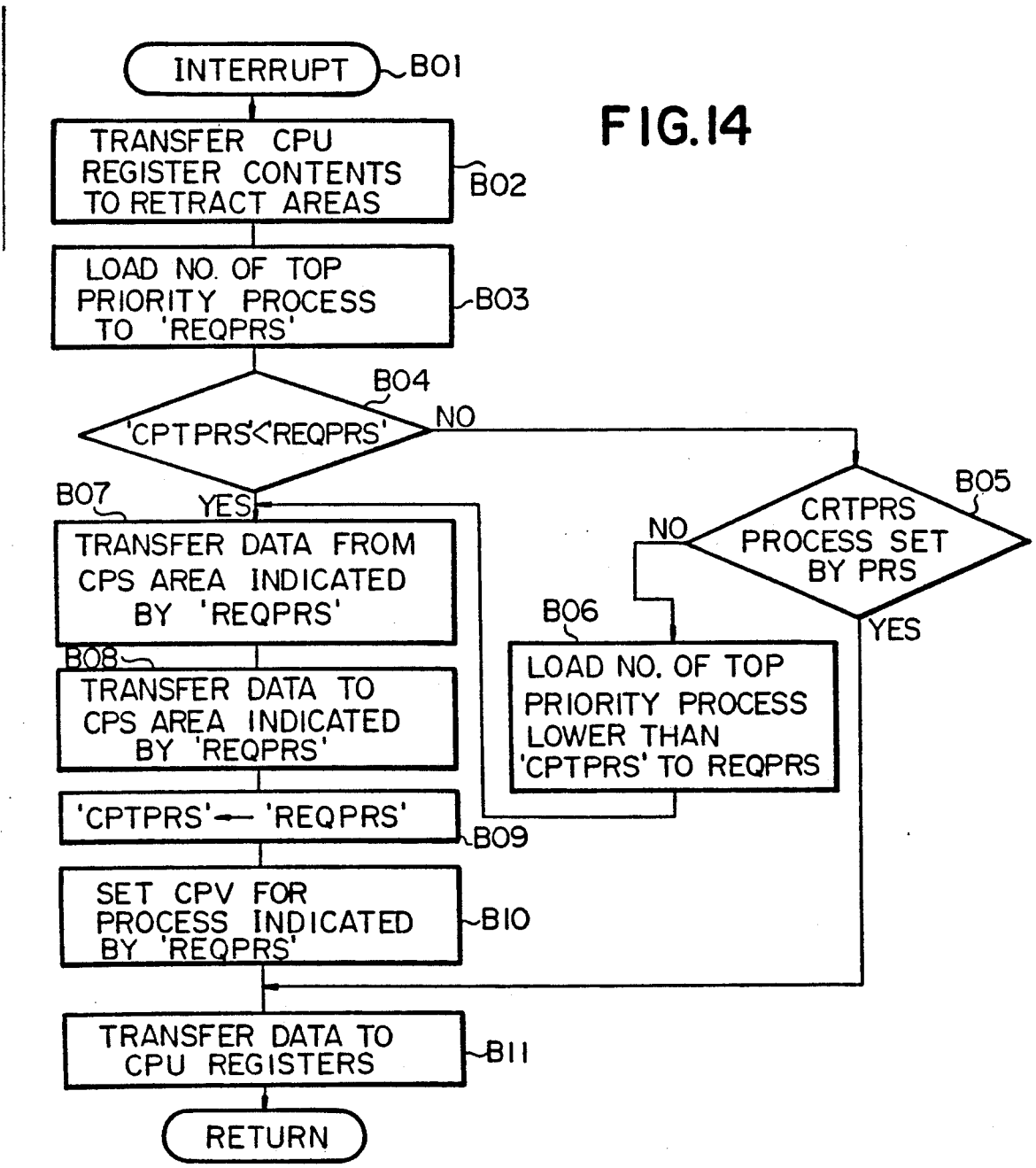
FIG. 14 is a flowchart showing the program stored in the scheduler which forms part of the system ROM unit incorporated in the bit-map control circuit illustrated in FIG. 7.

FIG. 14 shows the program stored in the scheduler 150 which forms part of the system ROM unit 122. The scheduler program is started at step B01 responsive to an interrupt signal supplied from the timer circuit 134 to the central processing unit 120. When a request for the timed interrupt is received at step B01, the contents of the registers in the central processing unit 120 are withdrawn into appropriate retract areas of the current process status block CPS (FIG. 7B). The step B02 is followed by step B03 at which the top-priority process program is selected out of the process programs represented by the various flags set on the process request vector PRV and the code number assigned to the particular process program is loaded into an REQPRS. In the CRTPRS is currently saved the code number assigned to the process program which had been under execution until the timed interrupt was requested. Comparison in respect of the order of priority is thus made between this code number and the code number now loaded into the REQPRS and it is tested at step B04 whether or not the process program indicated by the former is lower in the order of priority than the process program indicated by the latter.

If it is found at the step B04 that the process program indicated by the number loaded into the REQPRS is lower in the order of priority than the process program indicated by the number currently saved in the CRTPRS, the answer for the step B04 is given in the negative. In this instance, the central processing unit 120 of the bit-map control circuit 102 proceeds to a step B05 at which is confirmed whether or not the process program which had been under execution until the request for the timed interrupt for the process program with the lower order of priority was received has been cancelled with the flag of the process request vector PRV reset. If it is found at this step B05 that the flag of the process request vector PRV still remains valid for the process program which had been under execution, the answer for the step B05 is given in the affirmative. In this instance, the central processing unit 120 proceeds to a step B06 at which the contents of the retract areas of the current process status block CPS are returned to the registers in the central processing unit 120 for completing the remaining portion of the process program which had been under execution until the request for the timed interrupt was received.

If it is found at the step B05 that the flag of the process request vector PRV has been reset so that the process program which had been under execution until the request for the timed interrupt was received has been cancelled, then the answer for the step B05 is given in the negative. In this instance, the central processing unit 120 proceeds to step B06 at which the code number assigned to the process program which is lower in the order of priority than the process program indicated by the code number currently saved in the CRTPRS and which is higher in the order of priority than the remaining process programs is loaded into the REQPRS.

Subsequently to the step B06 or if it is found at the step B04 that the process program indicated by the number currently saved in the CRTPRS is lower in the order of priority than the process program indicated by the number loaded into the REQPRS, the central processing unit 120 proceeds to steps B07 and B08. At the step B07, the content of the retract area of the current process status block CPS storing the process program to be interrupted is transferred to the retract area of the current process status blocks CPS indicated by the code number saved in the CRTPRS and, at the subsequent step B08, the content of the retract area of the current process status block CPS indicated by the code number loaded into the REQPRS is transferred to the retract area of the block CPS from which the process program to be interrupted has been withdrawn.

Subsequently to the step B08, the code number for the process program now indicated by the REQPRS is loaded into the CRTPRS at step B09, whereupon the flag of the current process vector CPV is set for the process program indicated by the REQPRS at step B10. The content of the retract area of the current process status block CPS now storing the process program indicated by the code number indicated by the REQPRS is transferred from the block CPS to the registers in the central processing unit 120 for starting the execution of the newly requested process program.

Host Process Program

Figure 15A:
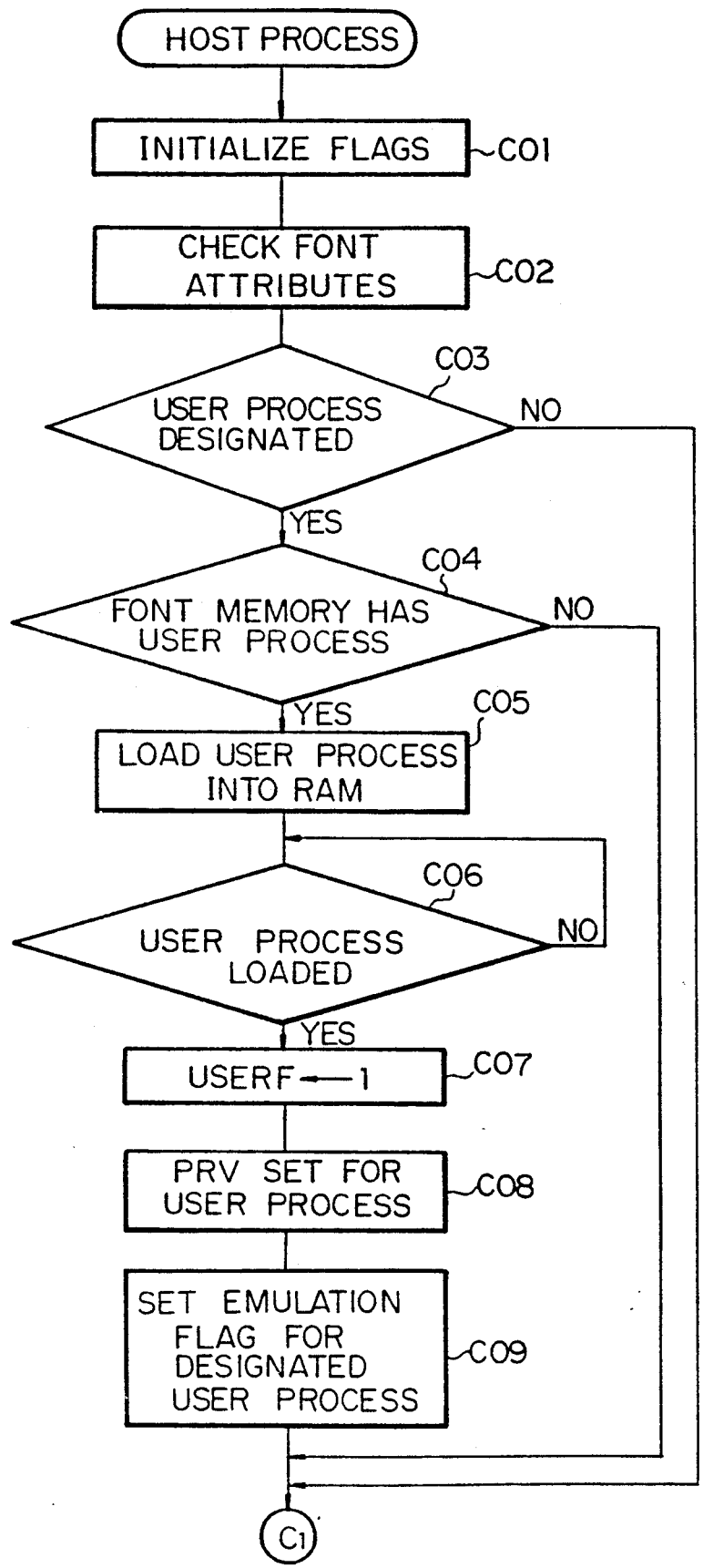
FIGS. 15A and 15B are flowcharts which show the host process program stored in the system ROM unit.
Figure 15B:
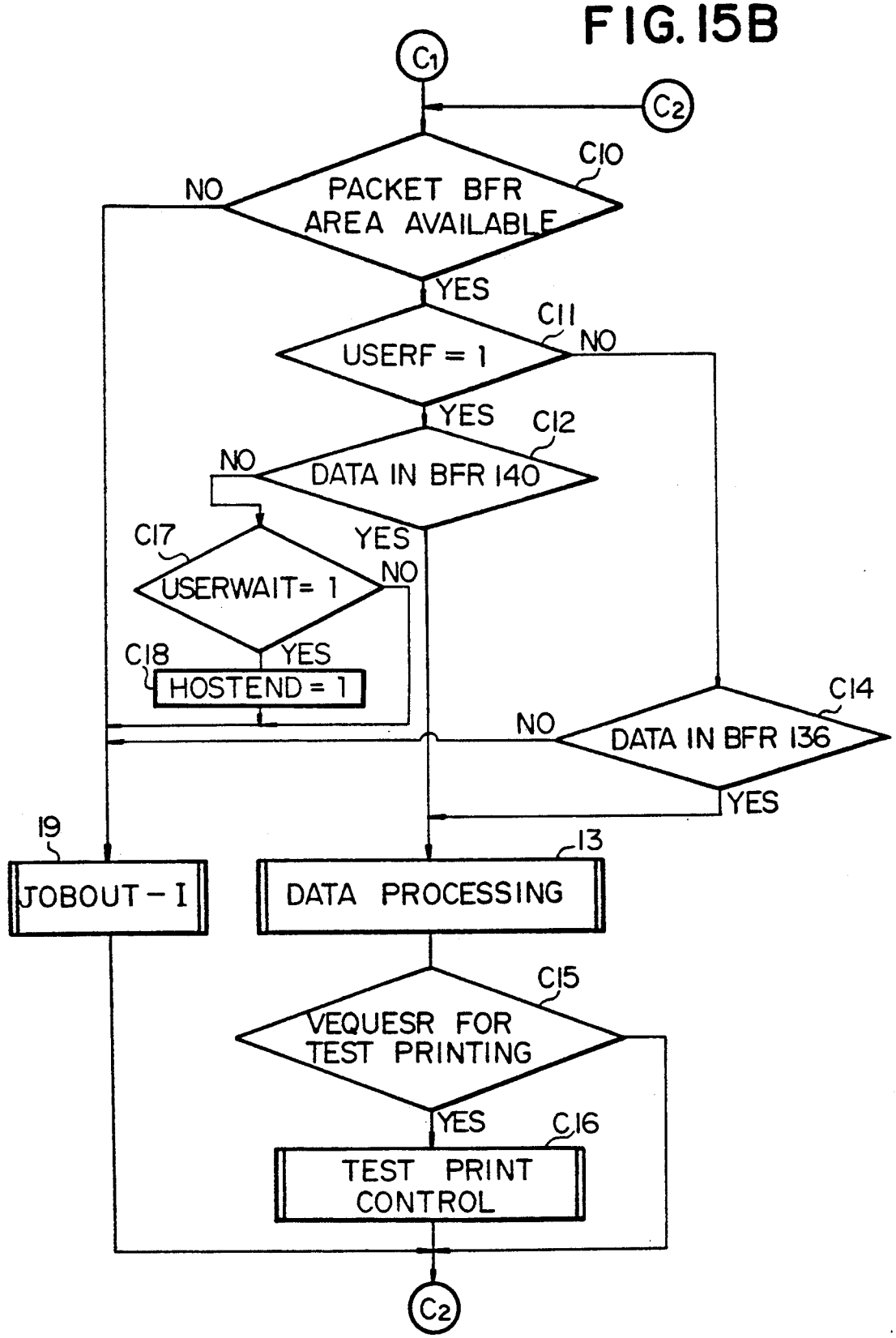

FIGS. 15A and 15B show the host process program 144 stored in the system ROM unit 122. As previously noted, the host process program 144 is executed to read data from either the "R" or data-latch buffer register 136 or from the "UR" or user data-latch buffer register 138 of the system RAM unit 124 (FIGS. 7 and 8), analyze the data received from the R or "UR" or user data-latch buffer register 136 or 138, generate data in the form of packets from the data received, and store the data packets into the packet buffer register 138.

As will be understood from the foregoing description, such a host process program 144 is started when the scheduler 150 is requested by timed interrupt from the central processing unit 120 to activate the program 144 with flag of the process request vector PRV reset for the host process program 144 through execution of the scheduler program hereinbefore described. The scheduler 150 being thus requested to activate the host process program 144 with the flag of the process request vector PRV thus reset for the program 144, the starting address for the host process program 144 is applied to the program counter within the central processing unit 120.

When the host process program 144 is thus activated, all the flags used for the program 144 are initialized at step C01 shown in FIG. 15A. For example, a flag USERF representative of the status of the user process program 148 may be set to logic "0" state to indicate that the user process program 148 is not or not to be under execution. At the step C01, a flag LPWRITE representative of the status of the data processing subroutine program (to be described later) is also set to logic "0" state to indicate that there is no data being edited into the form of packets for storage into the packet buffer register 138.

Subsequently to the initializing step C01, the font memorized in the font memory unit 98 is read out to check for the attributes of the font available and thereafter it is tested at step C03 whether or not there is a user process program 148 designated by the dip switch and further at step C04 whether or not the user process program 148 is incorporated within the font memory unit 98. When it is confirmed at this step C04 that the user process program 148 is incorporated within the font memory unit 98, then at step C05 the user process program 148 is loaded from the font memory unit 98 into the previously mentioned FIFO segment $S_1$ of the system RAM unit 124 (FIG. 7A). When it is then confirmed at step C06 that the user process program 148 has been completely loaded into the system RAM unit 124, the flag USERF representative of the status of the user process program 148 is set to logic "1" state at step C07 in preparation for the execution of the user process program 148. Then at step C08 the flag of the process request vector PRV is set for the user process program 148. These steps C04 to C07 are required to maintain the process request vector PRV biased to the process program with the lowest order of priority (which program is herein assumed to be the user process program) so that a request for the execution of the particular process program may not be unconditionally cancelled. The step C08 is followed by step C09 at which an emulation vector is set for the user process program 148 currently designated.

Upon termination of the step C09 or when it is found at the step C03 that no user process program 148 designated by the dip switch or at step C04 that the user process program 148 is not incorporated in the font memory unit 98, the central processing unit 120 of the bit-map control circuit 102 proceeds through a connector $C_1$ to the major process loop illustrated in FIG. 15B.

Initially in the major process loop shown in FIG. 15B, it is tested at step C10 whether or not the packet buffer register 138 has a free memory area available for storage of data and, if it is found that this is the case, it is further queried at step C11 whether or not the flag USERF is of the logic "1" state indicating that the user process program 148 is to be executed. When the answer for the step C11 is given in the affirmative, it is confirmed at step C12 whether or not there is data stored in the "UR" or user data-latch buffer register 140 of the system RAM unit 124 and, if it is found at step C12 that there is data stored in the "UR" or user data-latch buffer register 140, the central processing unit 120 proceeds to a data processing subroutine program C13. Thus, the data processing subroutine program C13 is executed when the packet buffer register 138 has a free memory area available for storage of data, the flag USERF indicates that the user process program 148 is to be executed, and there is data stored in the "UR" or user data-latch buffer register 140 of the system RAM unit 124.

If it is found at step C11 that the flag USERF is not of the logic "1" state indicating that the user process program 148 is not to be executed, it is questioned at step C14 whether or not there is a data stored in the "R" or data-latch buffer register 136 of the system RAM unit 124. If the answer for this step C14 is given in the affirmative, the step C14 is followed by the data processing subroutine program C13. Thus, the data processing subroutine program C13 is executed when the packet buffer register 138 has a free memory area available for storage of data and there is data stored in the "R" or data-latch buffer register 136 if the flag USERF indicates that the user process program 148 is not to be executed. Details of the data processing subroutine program C13 will be described later with reference to FIG. 17.

Upon termination of the data processing subroutine program C13, the central processing unit 120 of the bit-map control circuit 102 proceeds to step C15 to detect if there is a request for test printing operation. As has been noted, a request for test printing operation is made with the test print start key 52 depressed with the shift key 54 kept released on the control panel 50 illustrated in FIG. 2. When it is found at step C15 that there currently is the request for the test printing operation and accordingly the answer for the step C15 is given in the affirmative, the central processing unit 120 proceeds to a test print control subroutine program C16. Details of this test print control subroutine program C16 will be hereinafter described with reference to FIGS. 17A and 17B. Upon termination of the test print control subroutine program C16 or when it is found at step C15 that there currently is no request for the test printing operation, the central processing unit 120 of the bit-map control circuit 102 reverts through connector $C_2$ to step C09 to repeat the major process loop shown in FIG. 15B.

Figure 16:
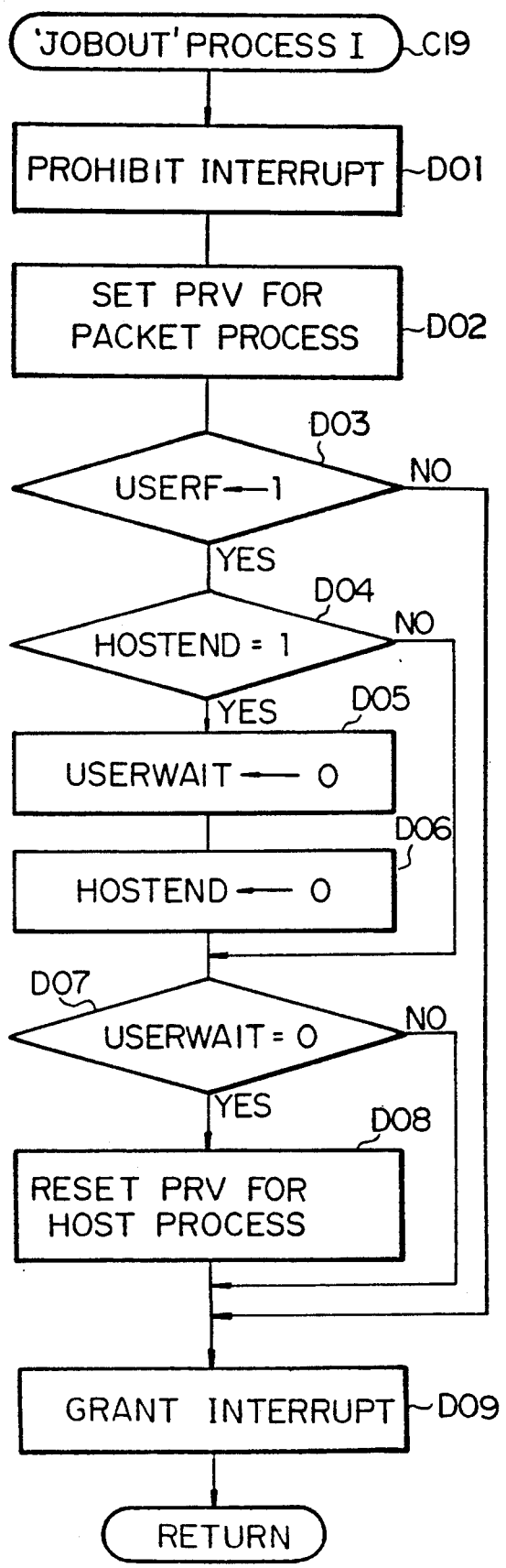
FIG. 16 is a flowchart showing the details of the JOBOUT-I subroutine program included in the host process program shown in the flowcharts of FIGS. 15A and 15B.

On the other hand, if it is found at step C12 that there is no data stored in the "UR" or user data-latch buffer register 140, it is tested at step C17 whether or not a flag USERWAIT is of logic "1" state indicating that a shift is being made to the user process program 148 from another process program. If the answer for this step C17 is given in the affirmative, a flag HOSTEND is set to logic "1" state at step C18 to indicate that a shift has been made to the user process program 148 and, thereafter, the central processing unit 120 proceeds to a JOBOUT-I process subroutine program C19. If the answer for the step C17 is given in the negative, the step C17 is followed directly by the JOBOUT-I process subroutine program C19 with the step C18 skipped over. The central processing unit 120 of the bit-map control circuit 102 also proceeds to the JOBOUT-I process subroutine program C19 when it is determined at step C10 that the packet buffer register 138 has no free memory area available for storage of data or at step C14 that there is no data stored in the "R" or data-latch buffer register 136 of the system RAM unit 124. Details of the JOBOUT-I process subroutine program C19 are shown in the flowchart of FIG. 16.

Upon termination of the JOBOUT-I process subroutine program C19, the central processing unit 120 of the bit-map control circuit 102 proceeds to step C15 to detect if there is a request for test printing operation. When the answer for the step C15 is given in the affirmative, the central processing unit 120 proceeds to the test print control subroutine program C16. Upon termination of the test print control subroutine program C16 or when the answer for the step C15 is given in the negative, the central processing unit 120 of the bit-map control circuit 102 reverts to step C09 to repeat the major process loop shown in FIG. 15B as above noted.

JOBOUT-I Process Subroutine Program (C19)

The JOBOUT-I process subroutine program C19 is executed to update the flag of the process request vector PRV to request the scheduler 150 to make a shift from any process program to a process program with a higher order of priority (which process program is in this instance assumed to be the packet process program 146) during execution of the host process program 144.

Such a JOBOUT-I process subroutine program C19 starts with a step D01 to prohibit the timed interrupt from the central processing unit 120 and then the central processing unit 120 of the bit-map control circuit 102 proceeds to step D02 at which the process request vector PRV is set for the packet process program 146, whereupon it is confirmed at step D03 whether or not the flag USERF is of the logic "1" state. If it is found at this step D03 that the flag USERF is of the logic "1" state indicating that the user process program 148 is to be executed, the step D03 is followed by step D04 at which is detected whether or not the flag HOSTEND is of the logic "1" state indicating that the user process program 148 is currently activated. When there is no data stored in the user data-latch buffer register 140, the flag HOSTEND is of the logic "1" state so that the answer for the step D04 is given in the affirmative. In this instance, the step D04 is followed by steps D05 and D06 to reset the flags USERWAIT and HOSTEND each to logic "0" state.

Subsequently to the steps D05 and D06 or when it is determined at step D04 that the flag HOSTEND is not of the logic "1" state indicating that the user process program 148 is currently not activated, the central processing unit 120 proceeds to step D07 to check if the flag USERWAIT is of the logic "0" state. If the answer for this step D07 is given in the affirmative, the step D07 is followed by step D08 to reset the flag of the process request vector PRV which has been set for the host process program 144.

Subsequently to this step D08 or when the answer for the step D03 is given in the negative, the flag of the process request vector PRV set for the host process program 144 is maintained because, in this instance, it is determined that the host process program 144 is the process program with the lowest order of priority. The prohibition of the timed interrupt is then cancelled at step D09 and then the central processing unit 120 of the bit-map control circuit 102 reverts to the step C15 of the routine program described with reference to FIGS. 15A and 15B.

When it is determined at step D03 that the flag USERF is of the logic "0" state indicating that the user process program 148 is not activated, it is the host process program 14 which has the lowest order of priority. On the other hand, when it is determined at step D03 that the flag USERF is of the logic "1" state indicating that the user process program 148 is activated, there is data remaining in the "UR" or user data-latch buffer register 140 so that the system is allowed to continue the execution of the host process program 140. Thus, when there is data remaining to be processed while a shift is being made to the user process program 148, the flag of the process request vector PRV which has been set for the host process program 144 is maintained as it is and, thus, the host process program 144 continues the execution of the data processing subroutine program C12. If, in this instance, there is no free memory area available for storage of data in the packet buffer register 138 so that the answer for the step C09 of the host process program 144 is given in the negative, the central processing unit 120 of the bit-map control circuit 102 proceeds to the JOBOUT-1 process subroutine program C18 as previously noted. The flag of the process request vector PRV which has been set for the host process program 144 is not reset (as at step D08) when a shift is being made to the user process program 148 with the answer for the step D07 given in the negative. When the flag of the process request vector PRV is thereafter reset for the packet process program 146 (as at step K01 of the JOBOUT-II subroutine program to be described with reference to FIG. 23) during execution of the packet process program 146, the process request vector PRV which has been set for the host process program 144 is maintained as it is and, for this reason, the host process program 144 described with reference to FIGS. 15A and 15B is restored upon termination of the JOBOUT-II subroutine program.

Where there is no data remaining in the "UR" or user data-latch buffer register 140, the flag HOSTEND is set to the logic "1" state as at step C18 so that the answer for the step D04 of the JOBOUT-I process subroutine program C19 is given in the affirmative. In this instance, each of the flags USERWAIT and HOSTEND is reset to the logic "0" state as at steps D05 and D06, respectively, of the JOBOUT-I process subroutine program D19 as previously described. The flag USERWAIT being thus reset to the logic "0" state at step D05, the answer for the step D07 is given in the affirmative so that the the process request vector PRV which has been set for the host process program 144 is reset as at step D08.

On the other hand, when it is determined at step D04 that the flag HOSTEND is not of the logic "1" state indicating that the user process program 148 is not currently activated, the steps D05 and D06 are skipped over and thus the step D04 is followed by directly by the step D07 to check if the flag USERWAIT is of the logic "0" state as above noted. If, in this instance, the answer for the step D07 is given in the affirmative, the execution of the host process program 144 is terminated with the flag of the process request vector PRV reset for the host process program 144. This is required because of the fact that the host process program 144 is not the process program with the lowest order of priority and thus abandons the right to be executed.

As will be understood from the above description, the JOBOUT-1 process subroutine program is executed when the packet buffer register 138 has no free memory area available for storage of data or there is no data stored in at least one of the "R" and "UR" or data-latch and user data-latch buffer registers 136 and 140 of the system RAM unit 124. If the scheduler 150 of the system ROM unit 122 is activated responsive to a request for timed interrupt during execution of the host process program 144, the central processing unit 120 of the bit-map control circuit 102 reverts to its initial step through the JOBOUT-I process subroutine program C14 unless and until the flag of the process request vector PRV set for the host process program 144 is reset. The data processing subroutine program C13 can thus be performed repeatedly during execution of the host process program 144.

It may be further added that, while a shift is being made to the user process program 148, the process request vector which has been set for the host process program 144 is maintained as it is until the flag HOSTEND is set to the logic "1" state. During shifting to the user process program 148, only the host process program 144 or the packet process program 146 is thus activated until the remaining data in the "UR" or user data-latch buffer register 140 is completely processed. Upon completion of the shifting to the user process program 148, the process request vector which has been set for the host process program 144 is reset and the packet process program 146 is temporarily activated with no actions made before the user process to which a shift has been made is to be executed.

Test Print Control Subroutine Program (C16)

Figure 17:
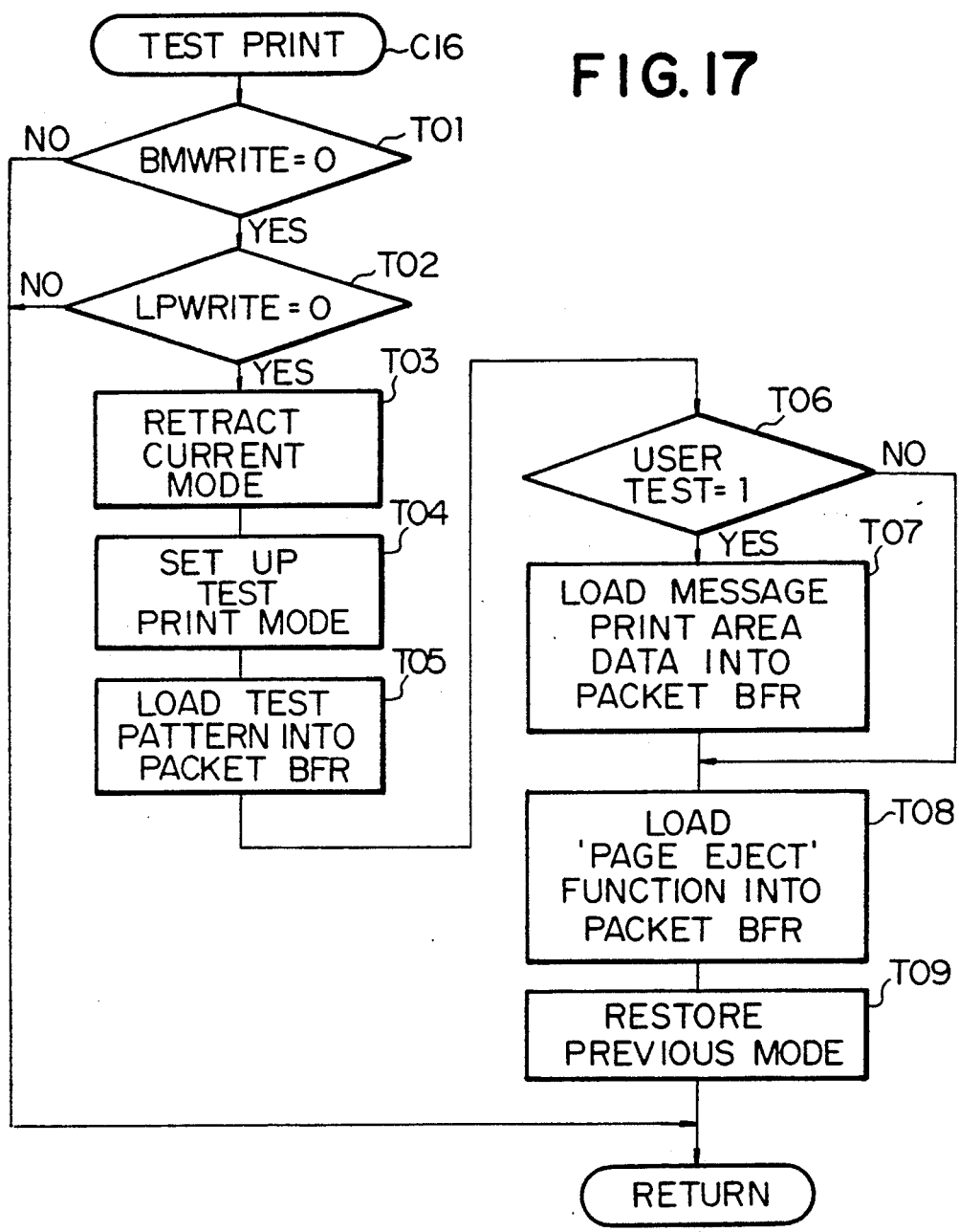
FIG. 17 is a flowchart showing the details of a test print control subroutine program also included in the host process program illustrated in FIGS. 15A and 15B.

FIG. 17 is a flowchart showing the details of the test print control subroutine program C16 included in the host process program 144 hereinbefore described with reference to FIGS. 15A and 15B.

The test print control subroutine program C16 is executed in the presence of a request for test printing operation in the printer control system 80. As has been noted, a request for test printing operation is made with the test print start key 52 depressed with the shift key 54 kept released on the control panel 50 illustrated in FIG. 2. A signal representative of such a request is supplied through the bus B8 to the interface control circuit 106 of the print engine control network 88 shown in FIG. 4. The interface control circuit 106 in receipt of the signal supplies a corresponding signal to the bit-map control circuit 102 of the data processing network 86 through the bus B3. On the basis of the signal thus supplied from the interface control circuit 106 of the print engine control network 88 to the bit-map control circuit 102 of the data processing network 86 shown in FIG. 4, it is detected at step C15 of the host process program 144 (FIGS. 15A and 15B) that there is, a request for test printing operation in the printer control system 80.

Referring to FIG. 17A, the test print control subroutine program C16 starts with step T01 check if a flag BMWRITE is of logic "0" state indicating that there currently is no data being written into the bit-map memory unit 96 (FIG. 4) through the bit-map data write interface circuit 132 and bus B3 (FIG. 5). If the answer for this step T01 is given in the affirmative, it is further tested at step T02 whether or not the flag LPWRITE indicative of the current status of the data processing subroutine program C13 is of the logic "0" state indicating that there is no data being edited into the form of packets for storage into the packet buffer register 138.

If the answer for this step T02 is also given in the affirmative, the central processing unit 120 of the bit-map control circuit 102 proceeds to a series of steps T03 to T09 to execute the test printing operation. Thus, the test printing operation is performed when there is no data being written into the bit-map memory unit 96 or being edited into the form of packets for storage into the packet buffer register 138.

If it is found at step T01 that there is data being written into the bit-map memory unit 96 or at step T02 that there is data being edited into the form of packets for storage into the packet buffer register 138, the central processing unit 120 of the bit-map control circuit 102 reverts to the host process program 144 described with reference to FIGS. 15A and 15B and may proceed to the decision step C10 thereof.

When the answer for each of the steps T01 and T02 is given in the affirmative, the central processing unit 120 of the bit-map control circuit 102 proceeds to step T03 at which the data currently stored in the registers in the central processing unit 120 are withdrawn into appropriate retract areas of the current process status block CPS (FIG. 7B). Thereupon, the central processing unit 120 proceeds to step T04 to set up the test printing mode of operation and select various operating conditions and parameters for use in the test printing mode of operation. These operating conditions and parameters typically include the quantity of the printed outputs to be produced and the bins to be put to use in the page sorter module 46 (FIG. 1).

The step T04 is followed by step T05 at which data representative of a prescribed test pattern (which indicates a usable font pattern and the operating conditions and parameters currently selected) is loaded into the packet buffer register 138. The test pattern to be loaded into the packet buffer register 138 has a message print area into which the "user" of the apparatus is permitted to register any desired information. Subsequently to step T05, it is confirmed at step T06 if a flag USER TEST is of logic "1" state indicating that so that the test pattern loaded into the packet buffer register 138 is thus tailored to the user of the apparatus. If the answer for this step T06 is given in the affirmative, the central processing unit 120 of the bit-map control circuit 102 proceeds to step T07 to store into the packet buffer register 138 the data thus registered in the message print area of the user tailored test pattern. The data registered in the message print area of the user tailored test pattern typically includes the data designated by the user protocol $P_u$ when the user process program 148 is activated and the image printing pattern.

Subsequently to step T07, a PAGE EJECT signal to be predominant over the pagination of the printed outputs in an ordinary mode of operation is loaded into the packet buffer register 138 at step T08. Thereupon, the data which have been withdrawn into appropriate retract areas of the current process status block CPS are transferred back into the registers of the central processing unit 102 to restore the previous mode of operation at step T09. The central processing unit 120 of the bit-map control circuit 102 reverts to the host process program 144 described with reference to FIGS. 15A and 15B and may proceed to the decision step C10 thereof.

Data Processinq Subroutine Program (C13)

Figure 18C:
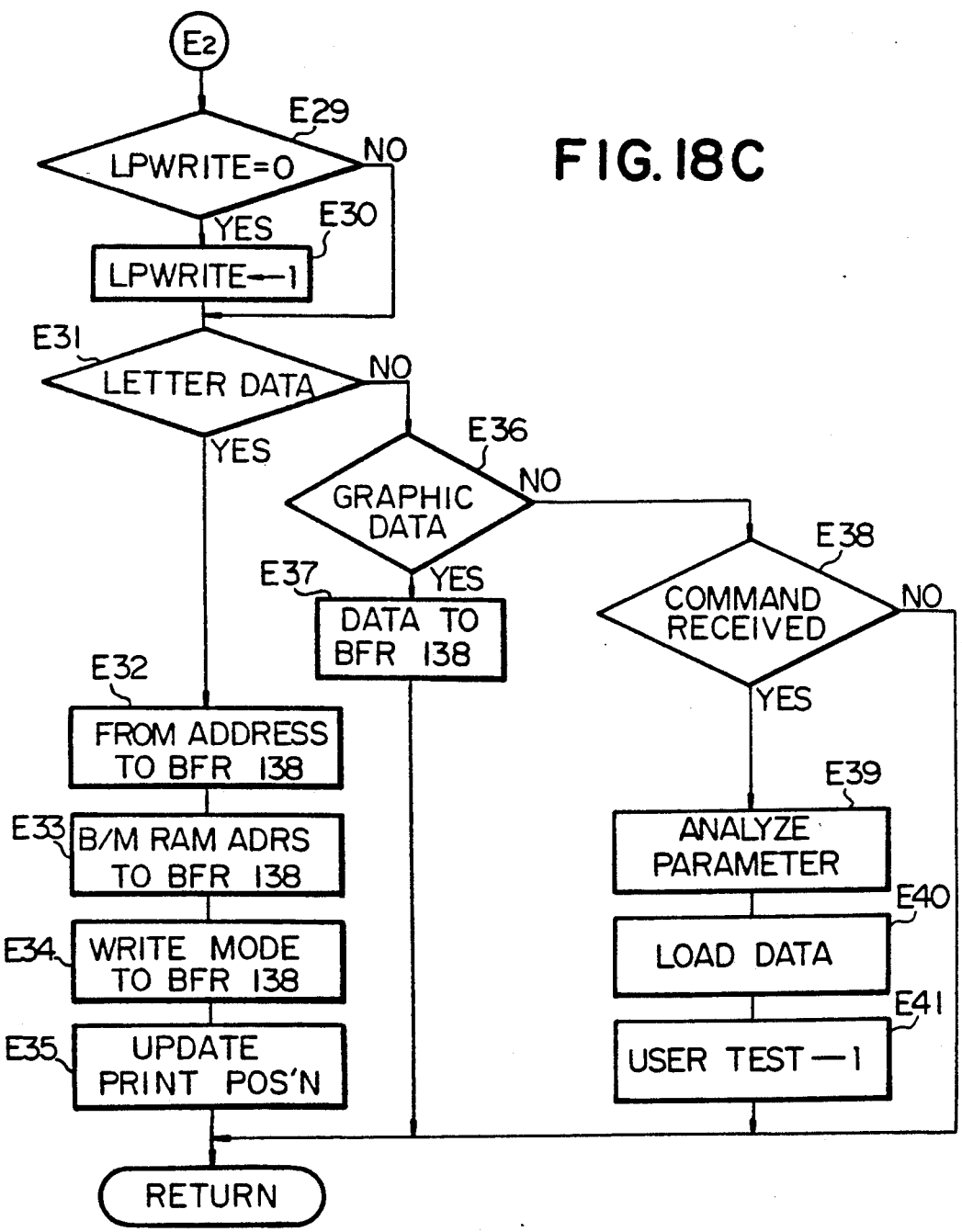

FIGS. 18A, 18B and 18C show the details of the data processing subroutine program C13 included in the host process program hereinbefore described with reference to FIGS. 15A and 15B.

In order that the data received by the printer control system 80 be processed in the control system 80, the data must be released from the "R" or data latch buffer register 136 into which the data has been stored. In the printer control system 80 embodying the present invention, the data supplied from the data processor unit 82 with the user protocol $P_u$ is initially loaded through the data input interface section 118 into the "R" or data-latch buffer register 136 of the system RAM unit 124 (under the control of the central processing unit 120 executing the data loading interrupt subroutine program to be described with reference to FIG. 21). When execution of the user process program 148 is requested with the flag USERF set at the logic "1" state, the data thus stored into the "R" or data-latch buffer register 136 is transferred to the "UR" or user data-latch buffer register 140 with the user protocol $P_u$ converted into the host protocol $P_h$ through execution of the user process program 148 read out from the system RAM unit 124. Accordingly, the data to be processed by the host process program 144 is supplied directly from the "R" or data-latch buffer register 136 when the flag USERF is of the logic "0" state and from the "UR" or user data-latch buffer register 140 when the flag USERF is of the logic "1" state.

Thus, the data processing subroutine program C12 starts with a decision step E01 to check if the flag USERF is of the logic "1" state. If it is found at this step E01 that the flag USERF is of the logic "1" state, the central processing unit 120 reads data from the "UR" or user data-latch buffer register 140 as at step E02 and, if it is found that the flag USERF is of the logic "0" state, then the central processing unit 120 reads data from the "R" or data-latch buffer register 136 as at step E03.

In the meantime, the data supplied from the data processor unit 82 may include any one or ones of the following five major types of information:

(a) coded print engine control data predominant over the operation of the print print engine module 42, this type of data being processed through steps E04 to E06, (b) coded job control data, which is processed through steps E07 to E11, (c) format control data predominant over the format in accordance with which prints are to be produced, which type of data is to be processed through steps E12 and E13, (d) image data consisting of coded alphanumerical and graphic information, which is processed through steps E32 and E33, and (e) user process control data to control the execution of the user process program 148, this type of data being processed through steps E17 to E21.

The job control data in particular include a coded PAGE EJECT signal to be used for pagination of printed outputs and a coded JOB START signal to be used for the grouping of pages.

For the processing of these different types of data, the central processing unit 120 of the bit-map control circuit 102 proceeds from the step E02 or the step E03 to a decision step E04 at which is confirmed whether or not the data received from the "R" or data-latch buffer register 136 or the "UR" or user data-latch buffer register 140 includes the coded print engine control data to be predominant over the operation of the print print engine module 42. If it is found at the step E04 that such control data is included in the data received, the control data is output to the packet buffer register 138 for transmission to the interface control circuit 106 of the print engine control network 88 through the control data bus B4 (FIG. 4). In order that the data is to be input to the interface control circuit 106 in synchronism with the image data to be input to the print head control circuit 110 of the print engine control network 88 through the image data but B, the print engine control data is supplied in the form of function-type intermediate code signals to the package buffer register 138. After the engine control data is thus input to the packet buffer register 138, the central processing unit 120 of the bit-map control circuit 102 executes the JOBOUT-I process subroutine program as at step E06 and, upon termination of the subroutine program, reverts to the host process program 144 hereinbefore described with reference to FIGS. 15A and 15B.

After the print engine control data is thus transferred to the packet buffer register 138, the answer for the decision step E04 turns negative. It is thus confirmed at step E07 whether or not the data received from the buffer register 136 or 140 includes the JOB START signal to be predominant over the grouping of pages. If it is found at the step E07 that the JOB START signal is contained in the data received, the signal is output to the packet buffer register 138 at step E08 for transmission to the interface control circuit 106 of the print engine control network 88. In this instance, the JOB START signal is also supplied in the form of function-type intermediate code signals to the package buffer register 138 for the reason above explained.

If it is found at the step E07 that the JOB START signal is not or no longer included in the data received, the step E07 is followed by a decision step E09 to confirm whether or not the data received from the buffer register 136 or 140 includes the PAGE EJECT signal to be predominant over the pagination of the printed output. If it is found at the step E09 that the PAGE EJECT signal is contained in the data received, the signal is processed in accordance with a PAGE EJECT subroutine program E10 as will be described with reference to FIG. 19 and thereafter further with the JOBOUT-I process subroutine program as at step E11. Upon termination of the JOBOUT-I process subroutine program at the step E11, the central processing unit 120 of the bit-map control circuit 102 reverts to the host process program 144 described with reference to FIGS. 15A and 15B.

If it is found at the step E09 that the PAGE EJECT signal is not or no longer included in the data received, the step E09 is followed by a decision step E12 to confirm whether or not the data received from the buffer register 136 or 140 includes the format control data predominant over the format in accordance with which a printed output is to be produced. In the presence of such a control data, the step E12 is followed by a format control subroutine program E13 the details of which will be described with reference to FIG. 20. Upon termination of the format control subroutine program at the step E13, the central processing unit 120 reverts to the host process program 144 described with reference to FIGS. 15A and 15B.

If the data supplied from the data processor unit 82 may include a signal indicating the number of the printed outputs to be produced for the same original image, it may be tested at step E14 whether or not such a signal is included in the data received from the buffer register 138 or 140. If it is found at this step E14 that there is such a signal contained in the data received, the signal is output to the packet buffer register 138 as at step E15 for transmission to the interface control circuit 106 of the print engine control network 88. In this instance, the signal is also supplied in the form of function-type intermediate code signals to the package buffer register 138, whereupon the central processing unit 120 of the bit-map control circuit 102 reverts to the host process program 144 described with reference to FIGS. 15A and 15B. If it is determined at the step E14 that the signal indicating the number of the printed outputs is not included in the data received, the central processing unit 120 of the bit-map control circuit 102 proceeds through connector $E_1$ to a decision step E16 shown in FIG. 18B.

At this decision step E16 is queried whether or not the data received from the buffer register 136 or 140 includes a coded signal requesting the loading of the user process program 148 from the font memory unit 98. If it is found that there is such a signal contained in the data received, parameter EMUNOW is set at step E17. The step E17 is followed by step E18 to confirm whether or not the flag USERF is of the logic "0" state. When it is found at this step E18 that the flag USERF is of the logic "1" state indicating that the user process program 148 is currently under execution, the central processing unit 120 proceeds to step E19 to check if the emulation vector differs from the parameter EMUNOW. If the answer for this step E19 is given in the affirmative or if it is found at the step E18 that the flag USERF is of the logic "0" state indicating that the user process program 148 is currently not in use, the step E18 or step E19 is followed by step E20 at which the user process program 148 is loaded from the font memory unit 98 into the previously mentioned download segment of the system RAM 124 (FIG. 5). When the loading of the user process program 148 is complete as confirmed at step E21, the flag USERF is reset to the logic "1" state as at step E22 to indicate that the user process program 148 is in use and, thereafter, the current process status block $A_3$ (CPS) assigned to the user process program 148 is initialized as at step E23. This step E23 is followed also when the answer for the step E19 is given in the negative. Subsequently to the step E23, the flag of the process request vector PRV is set for the user process program 148 as at step E24, whereupon the central processing unit 120 of the bit-map control circuit 102 reverts to the host process program 144 described with reference to FIGS. 15A and 15B.

If it is found at the step E16 that the data received from the buffer register 136 or 140 is devoid of the coded signal requesting the loading of the user process 148, the step E16 is followed by step E25 to confirm whether or not the data received includes a coded signal requesting the cancellation of the request for the execution of the user process program 148. If it is found at the step E25 that there is such a signal included in the data received, the flag USERF is reset to the logic "0" state as at step E26 to indicate that the user process program 148 is not to be executed and, thereafter, the flag of the process request vector PRV which has been set for the user process program 148 is reset at step E27. Subsequently to the step E27, the flag USER TEST is reset to the logic "0" state as at step E28 and, thereupon, the central processing unit 120 of the bit-map control circuit 102 reverts to the host process program 144 described with reference to FIGS. 15A and 15B.

If it is found at the step E25 that the signal requesting cancellation of the request for the execution of the user process program 148 is not included in the data received, the central processing unit 120 proceeds through connector $E_2$ to decision step E29 illustrated in FIG. 18C. At this step E29 is queried whether or not the previously noted flag LPWRITE representative of the status of the data processing subroutine program C13 is of the logic "0" state. If it found at this step E29 that the flag LPWRITE currently has the logic "1" state or after the flag LPWRITE is set to the logic "1" state at step E30 with the flag found to be of the logic "0" state at step E29, it is tested at step E31 whether or not the data received includes data representative of letter or alphanumerical images. If it is found at this step E31 that such alphanumerical image data is included in the data received, the data is input to the packet buffer register 138 at steps E32, E33, and E34 upon conversion into function-type intermediate code signals similar in format to the command signal supplied to the font data read/write control circuit 156 (FIG. 11). The data thus input to the packet buffer register 138 include addresses at which font data is to be read from the font memory unit 98 (step E32), addresses at which data is to be loaded into the bit-map memory unit 96 of the data processing network 86 shown in FIG. 4 (step E33), and an instruction for the data write mode of operation is input to the packet buffer register 138 (step E34). The addresses at which data is to be loaded into the bit-map memory unit 96 correspond to prescribed locations in the print area $A_p$ within the print sheet P shown in FIG. 12. Subsequently to the steps E23, E33, and E34, the print position at which an image is to be subsequently printed on the print area $A_p$ of the print sheet P (FIG. 12) are updated at step E35 and, thereupon, the central processing unit 120 of the bit-map control circuit 102 reverts to the host process program 144 described with reference to FIGS. 15A and 15B.

If it is found at the step E31 that alphanumerical data is not or no longer included in the data received, the step E31 is followed by step E36 at which is tested whether or not the data received includes data representative of graphic images. If it is found at this step E36 that such graphic image data is included in the data received, the data is input to the packet buffer register 138 at step E37. The data to be input to the packet buffer register 138 is also converted into function-type intermediate code signals similar in format to the command signal supplied to the graphic data read/write control circuit 154. Subsequently to the step E37, the central processing unit 120 of the bit-map control circuit 102 reverts to the host process program 144 described with reference to FIGS. 15A to 15B.

When it is determined at step E36 that the data received includes no data representative of graphic images, the step E36 is followed by a series of steps E38 to E41 through which data is registered into the user message print area of the test pattern. Registration of such data is effected on receipt of a user process test print data registration command. It is thus first checked at step E38 if the user process test print data registration command is received. If it is confirmed at step E38 that such a command has been received, analysis is made at step E39 into the parameter included in the command. Thereafter at step E40, the print engine status data designated by the parameter is generated and then the data edited into the form of packets for loading into the user message print area of the test pattern is stored into the user test pattern storage area provided in the system RAM unit 124 (FIG. 5). The step E40 is followed by step E41 at which the flag USER TEST is set to the logic "1" state to validate the user test pattern. Subsequently to the step E41, the central processing unit 120 of the bit-map control circuit 102 reverts to the host process program 144 described with reference to FIGS. 15A and 15B.

PAGE EJECT Subroutine Program (E10)

Figure 19:
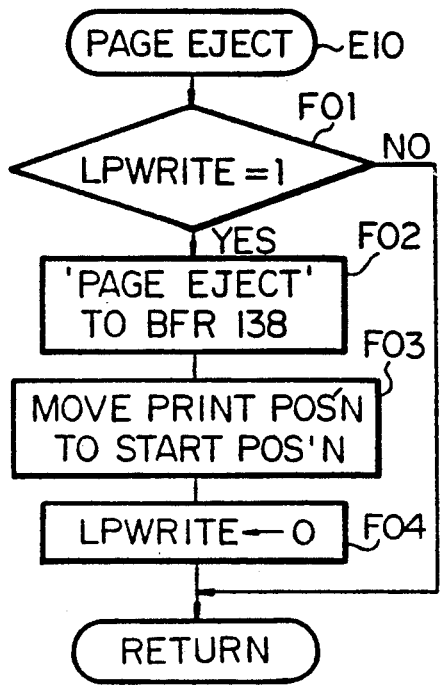
FIG. 19 is a flowchart showing the PAGE EJECT subroutine program included in the data processing subroutine program illustrated in the flowcharts of FIGS. 18A to 18C.

Referring to FIG. 19, the PAGE EJECT subroutine program E10 included in the data processing subroutine program C13 hereinbefore described is executed as a virtual processing subroutine program by means of which the PAGE EJECT signal is edited provisionally into the form of packets as the function-type intermediate code signals before the signal is transmitted from the "R" or data-latch buffer register 136 to the packet buffer register 138.

The PAGE EJECT subroutine program E10 is executed subsequently to the step E09 of the data processing subroutine program described with reference to FIGS. 18A to 18C. When it is found at the step E09 of the data processing subroutine program that the PAGE EJECT signal is contained in the data received from the "R" or data-latch buffer register 136 or "UR" or user data-latch buffer register 140, it is tested at step F01 whether or not the flag LPWRITE representative of the status of the data processing subroutine program C13 is of the logic "1" state. If it found at this step F01 that the flag LPWRITE currently has the logic "1" state, the PAGE EJECT signal is transmitted from the "R" or data-latch buffer register 136 or the "UR" or user data-latch buffer register to the packet buffer register 138 at step F02. Before the signal is thus transmitted to the packet buffer register 138, the signal is converted into the form of a packet as the function-type intermediate code signal. It may be herein noted that, at the point of time the intermediate code signal is thus received by the packet buffer register 138, the print sheet on which images have been printed completely is discharged through the print output module 46 of the printer apparatus 40 shown in FIG. 1.

The step F02 is followed by a step F03 at which the print position at which an image is to be printed on the print area $A_p$ of the subsequently supplied print sheet is moved to the start position of the print area $A_p$ (FIG. 12) and, thereupon, the flag LPWRITE is reset to the logic "0" state at step F04. Subsequently to the step F04 or when it is found at step F01 that the flag LPWRITE has the logic "0" state, the central processing unit 120 of the bit-map control circuit 102 reverts to the data processing subroutine program C13 hereinbefore described with reference to FIG. 18A to 18C.

Format Control Subroutine Program (E13)

Figure 20:
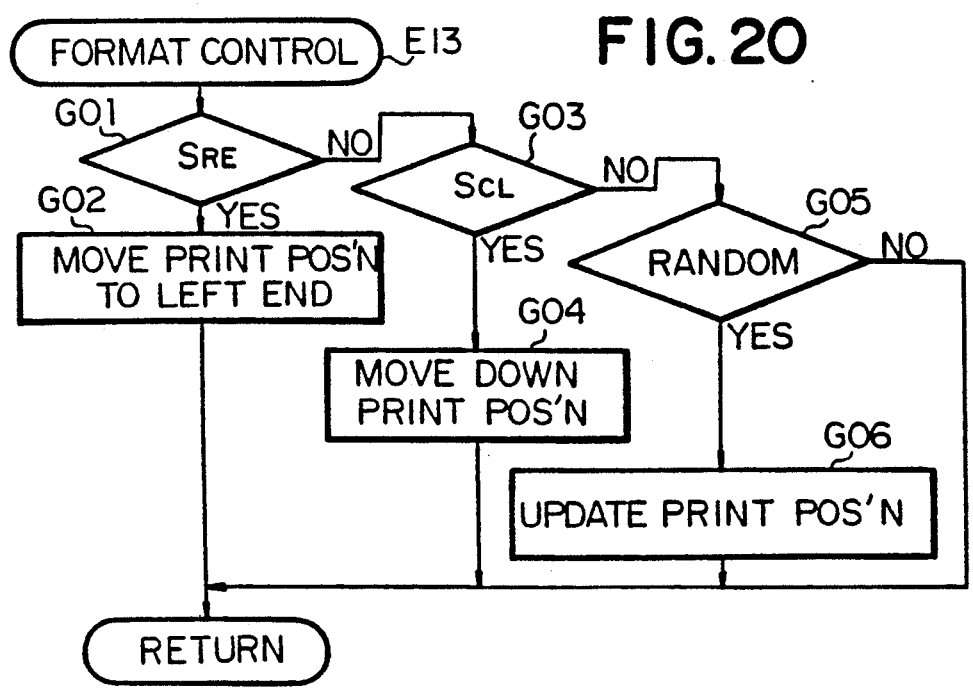
FIG. 20 is a flowchart showing the format control subroutine program also included in the data processing subroutine program illustrated in the flowcharts of FIGS. 18A to 18C.

Turning to FIG. 20, the format control subroutine program E13 included in the data processing subroutine program C13 described with reference to FIGS. 18A to 18C is started in response to the previously mentioned change-of-line instruction signal $S_{CL}$ or return-to-end-of-line instruction signal $S_{RE}$ which may be issued during printing of a line within the print area $A_p$ of a print sheet. Thus, when it is confirmed at step G01 that the return-to-end-of-line instruction signal $S_{RE}$ is included in the data received from the buffer register 136 or 140, the print position is moved to the left end of the line as at step G02 to re-start printing from the left end of the print area $A_p$. If it is found at the step G01 that the return-to-end-of-line instruction signal $S_{RE}$ is not included in the data currently received, the step G01 is followed by a step G03 at which it is checked whether or not the change-of-line instruction signal $S_{CL}$ is included in the data received. If it is confirmed at the step G03 that the change-of-line instruction signal $S_{CL}$, the print position is moved a predetermined vertical distance $D_s$ from the last print line at step G04.

Besides these change-of-line and return-to-end-of-line instruction signals $S_{CL}$ and $S_{RE}$, a random print position request signal $S_{RP}$ may be included in the data received from the buffer register 136 or 140. When it is found at the step G03 that the change-of-line instruction signal $S_{CL}$ is not included in the data currently received, the step G03 is followed by a step G05 at which it is queried whether or not there is the random print position request signal $S_{RP}$ included in the data received. If it is found at the step G05 that there is such a signal $S_{RP}$ included in the data received, an updated print position is calculated at step G06 with an appropriate offset value added to the current print position so that an image is to be subsequently printed at the updated print position within the print area $A_p$ of the print sheet P.

Subsequently to the step G02, G04 or G06 or when it found at the step G05 that the random print position request signal $S_{RP}$ is not included in the data received, the central processing unit 120 of the bit-map control circuit 102 reverts to the step E01 of the data processing subroutine program hereinbefore described with reference to FIGS. 18A to 18C.

Data Loading Interrupt Subroutine Program

Figure 21:
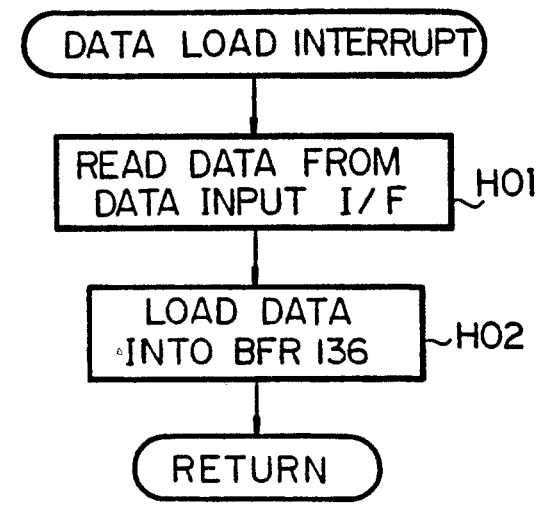
FIG. 21 is a flowchart showing the data loading interrupt subroutine program which controls the loading of data through the data input interface section into an initial buffer register included in the system RAM unit incorporated in the bit-map control circuit illustrated in FIG. 5.

In FIG. 21 is shown the flowchart of the data loading interrupt subroutine program which controls the loading of data through the data input interface section 118 into the "R" or data-latch buffer register 136 of the system RAM unit 124 (FIG. 5). Thus, the data loading interrupt subroutine program includes a step H01 at which data is supplied from the data processor unit 82 is transferred to the data input interface section 118 of the system RAM unit 124. At a subsequent step H02, the data thus loaded into the into the data input interface section 118 is then loaded into the "R" or data-latch buffer register 136 of the system RAM unit 124.

Packet Process Program

As noted previously, the packet process program 146 is executed to analyze the data packets stored into the packet buffer register 138, control access to the font memory unit 98 to read data from the memory unit 98, transmit data to the bit-map data read/write circuit 100 to write data into the bit-map memory unit 96, and transmit data to the interface control circuit 106 to control the record medium supply module 44 and the page sorter included in the print output module 46 of the printer apparatus 40.

Figure 22:
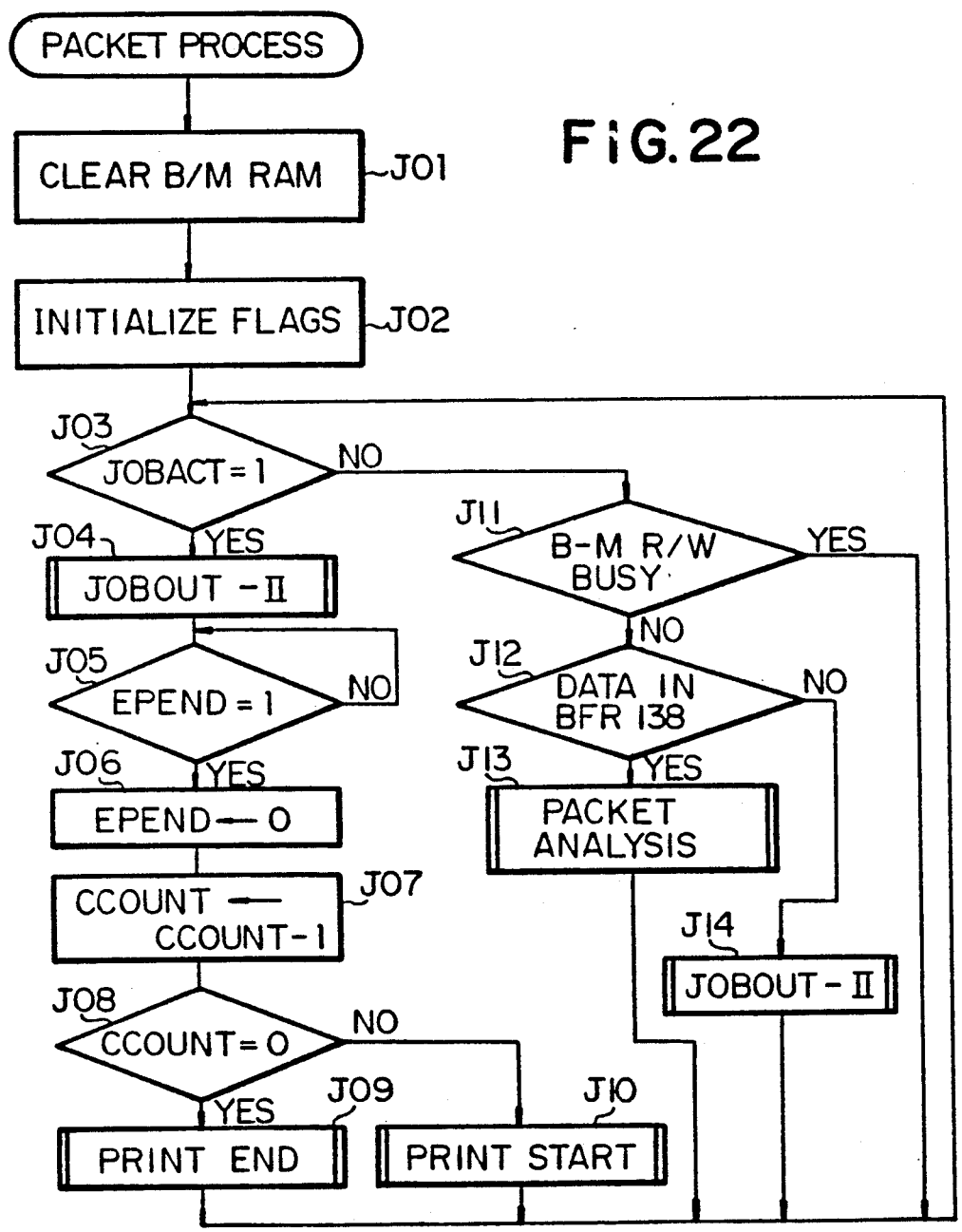
FIG. 22 is a flowchart showing the details of the packet process program also stored in the system ROM unit.

Referring to FIG. 22, the central processing unit 120 of the bit-map control circuit 102 starts execution of the packet process program 146 with the printer apparatus 40 switched in and first proceeds to step J01 to clear the image data area of the bit-map memory unit 96 of the bit-map data processing network 86 (FIG. 4). Subsequently to the step J01, the control flags predominant over the packet process program 146 are initialized each to a logic "1" state. These control flags include a flag JOBACT indicative of a particular state of the printer apparatus 40, a flag BMWRITE to request loading of data into the bit-map memory unit 96, a flag COPY indicating the desired total number of the print sheets to be output for the same original image, a flag CCOUNT indicating the current number of the print sheets to be output in addition to the print sheet or sheets already output for the same original image. The flag CCOUNT is to be decremented each time a print sheet is output for the same original image. The flag JOBACT of a logic "1" state is indicative of the state of the printer apparatus 40 allowing a print sheet to be discharged through the print output module 46.

The central processing unit 120 of the bit-map control circuit 102 then proceeds to a major process loop in which it is initially tested at step J03 whether or not the flag JOBACT has the logic "1" state. If the answer for this step J03 is given in the affirmative allowing a print sheet is to be discharged from the printer apparatus 40, the central processing unit 120 executes a sequence of print control steps starting with a JOBOUT-II process subroutine program J04. The details of this JOBOUT-II process subroutine program J04 will be hereinafter described with reference to FIG. 22. Upon termination of the JOBOUT-II process subroutine program J04, it is tested at step J05 whether or not a flag EXPEND is of a logic "1" state. This flag EXPEND is set or reset responsive to an interrupt command EXPEND to terminate the optical scanning of the original image and is set to the logic "1" state in response to the command EXPEND. The details of the EXPEND interrupt subroutine program will be described hereinafter with reference to FIG. 26.

When it is found at the step J05 that the flag EXPEND has the logic "1" state, the flag EXPEND is reset to logic "0" state at a subsequent step J06 and further at step J07 the flag CCOUNT is decremented with a print sheet output for the same original image and discharged from the apparatus 40. The step J07 is followed by a step J08 at which is queried whether or not the flag CCOUNT indicating the current number of the print sheets which remain to be output has reached zero, viz., all the desired number of print sheets have been output for the same original image. When the answer for the step J08 is given in the affirmative, the current cycle of printing operation is terminated through execution of a print end subroutine program J09 and, if the answer for the step J08 is given in the negative, the subsequent cycle of printing operation is started through execution of a print start subroutine program J10. The details of these print end and start subroutines J09 and J10 will be hereinafter described with reference to FIGS. 23 and 24, respectively.

When it is found at the step J03 whether or not the flag JOBACT has the logic "0" state, it is further tested at step J11 whether or not the bit-map read/write circuit 100 is currently in operation. If it is found at this step J11 that the bit-map read/write circuit 100 is busy, the step J11 is followed by a step J12 at which is queried whether or not there currently is data stored in the form of packets or function-type intermediate code signals within the packet buffer register 138. If it is determined at the step J12 that such data is stored in the packet buffer register 138, the central processing unit 120 reads the packet data stored in the packet buffer register 138 and analyzes the data through execution of a data analysis subroutine program J13. The details of this data analysis subroutine program J13 will be hereinafter described with reference to FIGS. 25A and 25B.

When it is found at the step J12 that data in the form of packets is stored in the packet buffer register 138, the central processing unit 120 of the bit-map control circuit 102 proceeds to the JOBOUT-II process subroutine program as at step J14. Upon termination of the print end subroutine program J09 or the print start subroutine program J10, the packet analysis subroutine program J13, or the JOBOUT-II process subroutine program at step J14, the central processing unit 120 of the bit-map control circuit 102 reverts to the step J03 to repeat the process loop as hereinbefore described with reference to FIG. 22.

JOBOUT-II Process Subroutine (J04/J14)

Figure 23:
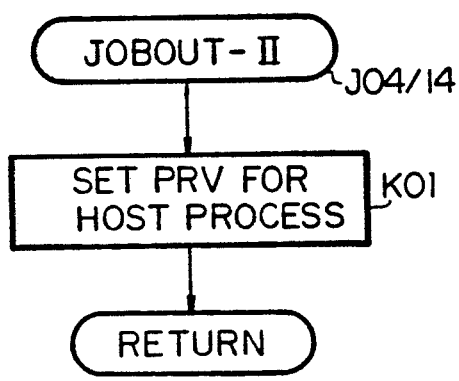
FIG. 23 is a flowchart showing the details of the JOBOUT-II subroutine program included in the packet process program shown in the flowchart of FIG. 22.

FIG. 23 is a flowchart showing the details of the JOBOUT-II process subroutine program J04 or J14 included in the packet process program hereinbefore described. The JOBOUT-II process subroutine program J04/J14 is executed as the step J04 to start the sequence of print control steps or when it is found that data is no longer stored in the packet buffer register 138 as confirmed at the step J12 in the packet process program.

Such a JOBOUT-II process subroutine program J04/J14 starts comprises step K01 at which the flag of the process request vector PRV is set for the host process program 144. In this instance, the process request vector PRV is set for the process program having the lowest order of priority and, for this reason, the scheduler 150 proceeds to the lowest order process program with the process request flag reset for the packet process program 146. The packet process program 146 having the highest order priority, there is no process program activated as in the case of the step J04. When there is no job to be performed, a shift is made to the lower order process program as in the case of the step J14 in the packet process routine program.

The JOBOUT-II process subroutine program J01/J14 thus executed is followed by the step J05 to query whether or not the flag EPEND is of the logic "1" state or by the step J03 to repeat the process loop of the packet process program described with reference to FIG. 22.

Print End Subroutine Program (J09)

Figure 24:
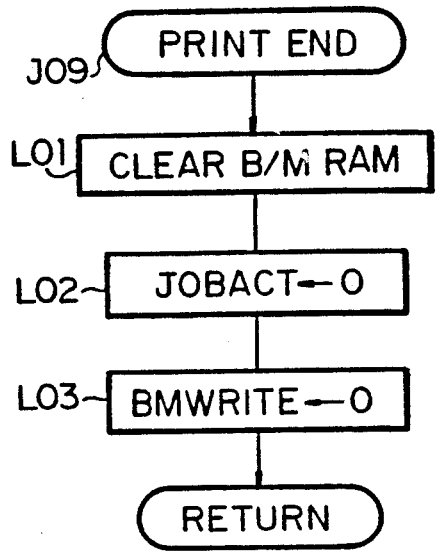
FIG. 24 is a flowchart showing the details of the print end subroutine program also included in the packet process program shown in the flowchart of FIG. 22.

FIG. 24 is a flowchart showing the details of the print end subroutine program J09 also included in the packet process program described with reference to FIG. 22.

The print end subroutine program J09 is executed when it is determined at the step J08 of the packet process program that all the desired number of print sheets have been output for the same original image and starts with a step L01 to clear the content of the bit-map memory unit 96 at step L01 to enable the bit-map memory unit 96 to accept data in the subsequent cycle of operation. The step L01 is followed by a step L02 at which the flag JOBACT is reset to the logic "0" state to clear the state of the printer apparatus 40 allowing a print sheet to be discharged through the print output module 46. Subsequently, the flag BMWRITE to request loading of data into the bit-map memory unit 96 is reset to the logic "0" state at step L03.

The print end subroutine program thus executed is followed by the step J03 to repeat the process loop of the packet process program described with reference to FIG. 22.

Print Start Subroutine Program (J10)

Figure 25:
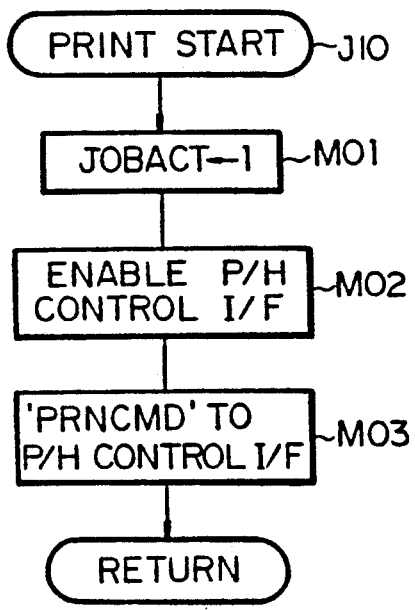
FIG. 25 is a flowchart showing the details of the print start subroutine program further included in the packet process program shown in the flowchart of FIG. 22.

FIG. 25 is a flowchart showing the details of the print start subroutine program J10 further included in the packet process program described with reference to FIG. 22.

The print start subroutine program J10 is executed when it is determined at the step J08 of the packet process program that all the desired number of print sheets have not been output for the same original image. The subroutine program J10 starts with a step M01 at which the flag JOBACT is set to the logic "1" state indicating the state of the printer apparatus 40 allowing a print sheet to be discharged through the print output module 46. The step M01 is followed by a step M02 at which an instruction signal is issued from the central processing unit 120 to enable the print head control interface circuit 160 (FIG. 11), whereupon at step M03 a print command signal PRNCM is input to the interface control circuit 106 of the print engine control network 88 (FIG. 4). Accordingly, the print head control interface circuit 160 is enabled to transmit data from the bit-map RAM 96 to the print head control circuit 110 through the image data bus B4.

Figure 27:
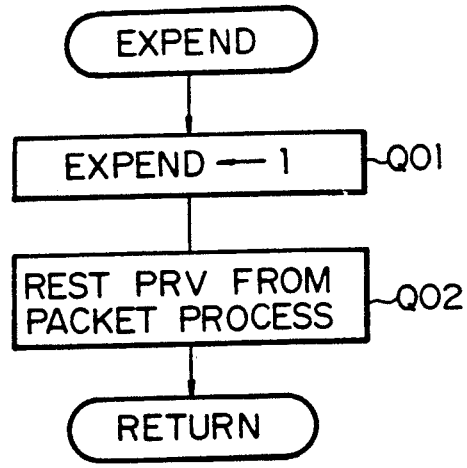
FIG. 27 is a flowchart showing the details of the EXPEND interrupt subroutine program to be used in the packet process program shown in the flowchart of FIG. 22.

When he printing operation is complete through execution of the print end subroutine program, the central processing unit 120 of the bit-map control circuit 102 reverts to the step J03 to repeat the process loop of the packet process program described with reference to FIGS. 21A and 21B. The flag JOBACT still having the logic "1" state, the central processing unit 120 executes the sequence of print control steps starting with the JOBOUT-II process subroutine program J04. Upon termination of the JOBOUT-II process subroutine program J04, the central processing unit 120 awaits until the flag EXPEND shifts to logic "1" state in response to the interrupt command EXPEND to terminate the optical scanning of the original image. The details of the EXPEND interrupt subroutine program are shown in FIG. 27.

Data Analysis Subroutine Program (J13)

Figure 26A:
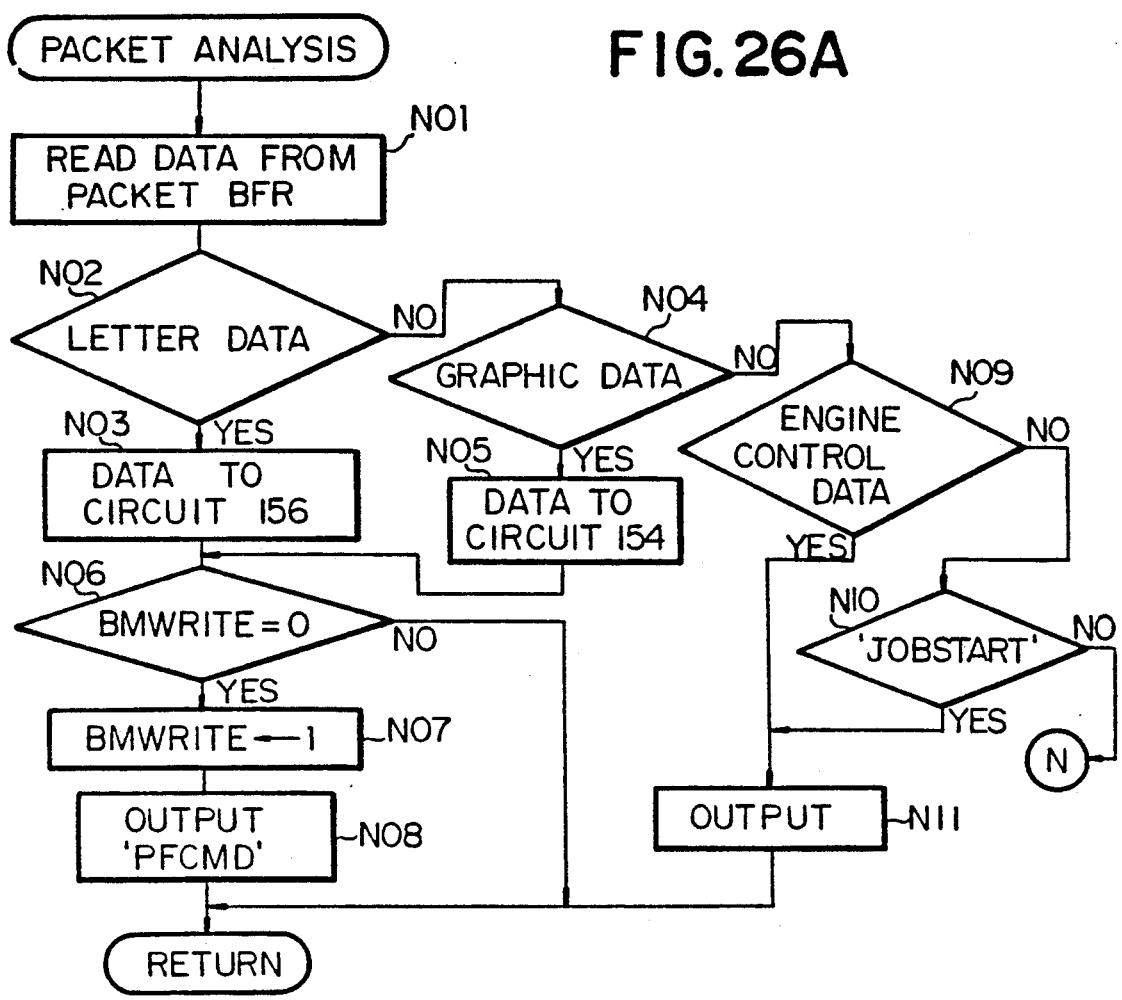
FIGS. 26A and 26B are flowcharts showing the details of the data analysis subroutine program further included in the packet process program shown in the flowchart of FIG. 22.
Figure 26B:
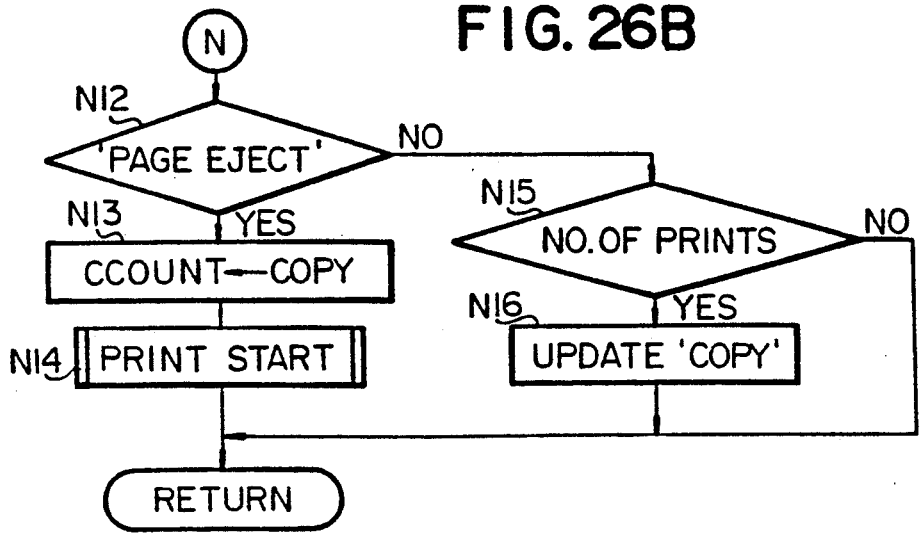
Figure 28A:
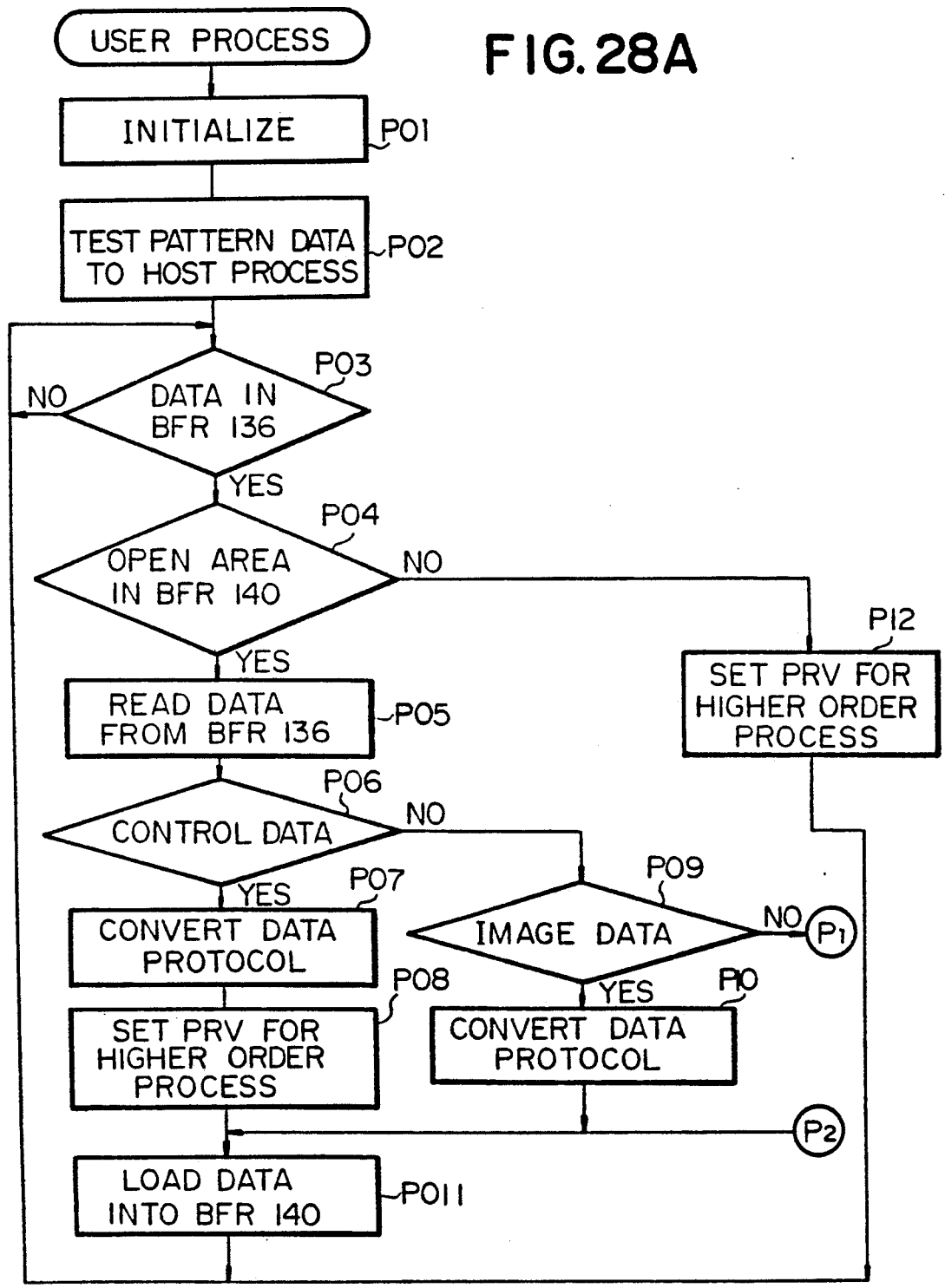
FIGS. 28 (a) and (b) are a flowchart showing the details of the user process program also stored in the system RAM unit.
Figure 28B:
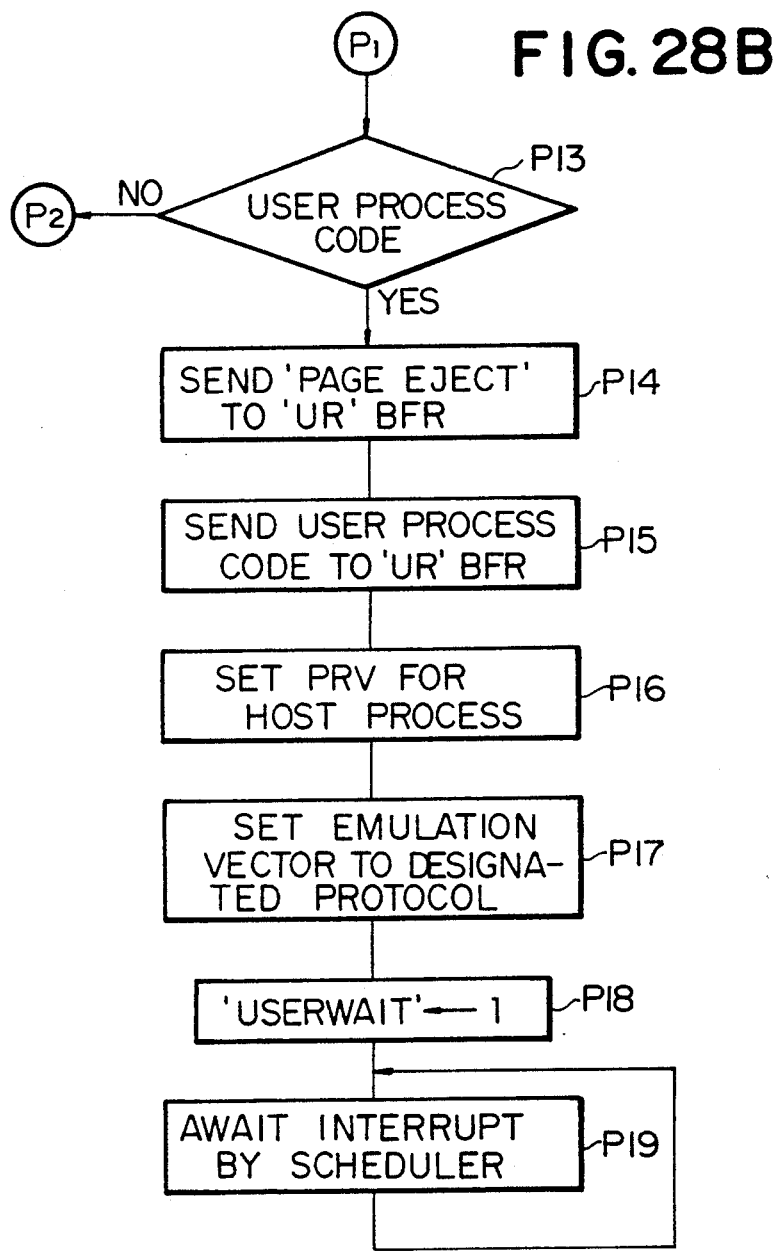

FIGS. 26A and 26B show the details of the data analysis subroutine program J13 further included in the packet process program described with reference to FIG. 22.

The data analysis subroutine program is executed to load data into the bit-map memory unit 96 in response to function-type intermediate code signals and outputs command signals to control the operation of the print engine module 42. Such a subroutine program is executed when it is found at the step J12 of the packet process program that there is data stored in the form of packets or function-type intermediate code signals within the packet buffer register 138.

When it is determined at the step J12 that such data is stored in the packet buffer register 138, the central processing unit 120 reads the packet data from the packet buffer register 138 at step N01 and then queries at step N02 whether or not the packet data contains alphanumerical data. If it is found at this step N02 that the packet data read from the packet buffer register 138 contains alphanumerical data, the alphanumerical data is output to the font data read/write control circuit 156 (FIG. 11) at step N03. If it is found at the step N03 that alphanumerical data is not or no longer contained in the packet data read from the the packet buffer register 138, it is further tested at step N04 whether or not the packet data contains graphic data. If it is found at this step N04 that the packet data read from the packet buffer register 138 contains graphic data, the graphic data is output to the graphic data read/write control circuit 154 (FIG. 11) at step N05. The step N03 or the step N05 is followed by a step N06 at which is tested whether or not the flag BMWRITE to request loading of data into the bit-map memory unit 96 is of the logic "0" state indicating that the current data write cycle is the first write cycle of the printing operation to be started. If it is determined at the step N06 that the flap BMWRITE is of the logic "0", the flag is set to logic "1" state at step N07, whereupon the central processing unit 120 proceeds to step N08 to supply a command signal PFCMD to the interface control circuit 106 of the print engine control network 88 (FIG. 4). The command signal PFCMD is effective to enable the print engine module 42 to set to preparatory steps for starting the printing operation. The bit-map data processing network 86 (FIG. 4) is now ready for printing operation. If it is determined at the step N06 that the flap BMWRITE is of the logic "1", the central processing unit 120 of the bit-map control circuit 102 reverts to the packet process program of FIG. 22.

When it is found at the step N04 that graphic data is not or no longer contained in the packet data read from the packet buffer register 138, it is tested at step N09 whether or not the packet data contains print engine control data to be predominant over the operation of the print print engine module 42. Thereafter, it is tested at step N10 whether or not the packet data read from the packet buffer register 138 includes the JOB START signal to be predominant over the grouping of pages as previously noted in connection with the data processing subroutine program with reference to FIGS. 18A to 18C. When it is found at the step N09 to N10 that the packet data read from the packet buffer register 138 contains the print engine control data or the JOB START signal, respectively, the data or signal is output at step N11.

It is thereafter confirmed at step N12 whether or not the PAGE EJECT signal to be predominant over the pagination of the printed output is present. When such a signal is detected at step N12, it is determined that the conversion of the signals to be used for the printing of a page is complete and, as such, the number indicated by the flag CCOUNT indicating the current number of the print sheets to be output is set for the flap COPY as at step N13. On the basis of the flap COPY which indicates the desired total number of the print sheets to be output for the same original image, the central processing unit 120 then start printing operation through execution of the print start subroutine program as at step N14.

When it is confirmed at the step N12 that there is no PAGE EJECT signal predominant over the pagination of the printed output, it is checked at step N15 whether or not the desired number of the print sheets to be output for the same original image has been renewed. If the answer for this step N15 is given in the affirmative, the flag COPY is updated to represent the renewed number of print sheets at step N16.

EXPEND Interrupt Subroutine Program

FIG. 27 is a flowchart showing the details of the EXPEND interrupt subroutine program to be used in the packet process program described with reference to FIG. 22. The EXPEND interrupt subroutine program starts with a step Q01 at which the flap EXPEND is set to the logic "1" state, whereupon the flap of the process request vector PRV set for the packet process program is reset at step Q02. When the command signal EXPEND is detected, the flap EXPEND shifts to logic "1" state so that the central processing unit 120 proceeds to the step J06 in the packet process subroutine program described with reference to FIG. 22 so that the flag EXPEND is reset to logic "0" state.

User Process Program

The user process program 148 is executed if and when the user protocol $P_u$ dictating the data supplied from the data processor unit 82 differs from the host protocol $P_h$ used in the printer apparatus 40. As noted previously, this program 148 is executed to convert such a user protocol $P_u$ dictating the data stored into the "R" or data-latch buffer register 136 into a host protocol $P_h$ which can be analyzed by the host process program, and transmit data with the host protocol $P_h$ to the packet buffer register 138 via the "UR" or user data-latch buffer register 140.

The user process program 148 starts with a step P01 to initialize the user process program 148, whereupon the data representative of the user tailored test pattern is sent to the host process program 144 at step P02. The step P02 is followed by step P03 at which it is tested whether or not there is data stored in the "R" or data-latch buffer register 136 of the system ROM unit 122 and, when it is found that there is data in the "R" or data-latch buffer register 136, it is confirmed at step P04 whether or not the "UR" or user data-latch buffer register 140 has a free memory area available for storage of data. If it is found that there is a free memory area available for storage of data in the "UR" or user data-latch buffer register 140, the data is read from the "R" or data-latch buffer register 136 at step P05, whereupon steps are followed for the conversion of the user protocol. For this purpose, it is first queried at step P06 whether or not control data is contained in the data read from the "R" or data-latch buffer register 136 and, if it is found that this is the case, the protocol for the control data is converted at step P07. Upon termination of the process step P07, the flag of the process request vector PRV is set for the process program with a higher priority order (which process is herein assumed to be the host process program 144) as at step P08.

When it is found at the step P06 that control data for the protocol conversion is not or no longer contained in the data read from the "R" or data-latch buffer register 136, it is first queried at step P09 whether or not image data is contained in the data read from the buffer register 136. If it is found that this is the case, the protocol for the image data is converted at step P10. Subsequently to the step P08 or the step P10, the control data or the image data with the protocol converted is loaded into the "UR" or user data-latch buffer register 140 at step P11 for transmission to the packet buffer register 138. When it is found at the step P04 that there is no data in the "R" or data-latch buffer register 136, the flag of the process request vector PRV is set for the process program (host process program 144) with a higher priority order as at step P12.

If it is found at step P09 that image data is not contained in the data read from the buffer register 136, it is checked at step P13 if there is present a code designating the user process program 148. When it is detected that there is images being reproduced and accordingly the answer for this step P13 is given in the affirmative, the code PAGE EJECT is sent to the "UR" or user data-latch buffer register 140. Subsequently to the step P14, the code designating the user process program 148 is sent to the user data-latch buffer register 140 at step P15 and, thereafter, the process request vector PRV is set for the process program currently having the higher order of priority as at step P16.

Thereupon, the the emulation vector is set at step P17 to a value indicating the process program designated by the parameter included in the code designating the user process program 148. The step P17 is followed by step P18 at which the flag USERWAIT is set to the logic "1" state to process the remaining data for the preceding user process. Subsequently to step P18, the central processing unit 120 of the bit-map control circuit 102 awaits an interrupt from the scheduler 150.

The flag USERWAIT used in the user process program 148 is common to that used in the host process program 144 and, when the flag is set to the logic "1" state, the execution of the user process program 148 currently designated is held abeyance until the flag USERWAIT is set to the logic "1" state.

Figure 29:
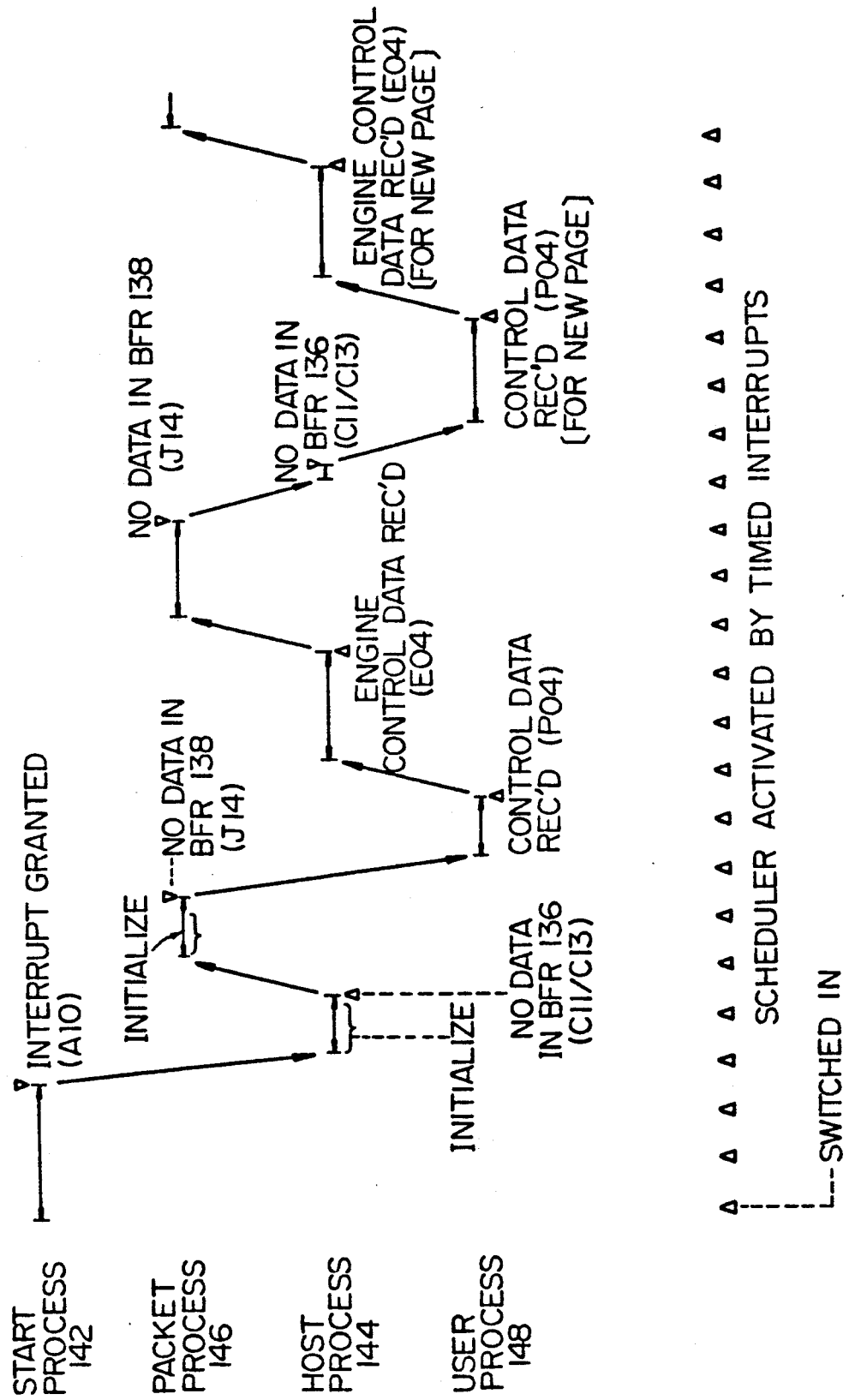
FIG. 29 is a diagram showing the timings at which the host, packet and user process programs are to be executed in response to the times interrupts from the central processing unit.

FIG. 29 shows the timings at which the host, packet and user process programs 144, 146 and 148 are to be executed in response to the times interrupts to the scheduler 150 from the central processing unit 120. It will be seen from this timing diagram that a shift is made between these host, packet and user process programs 144, 146 and 148 when request for the execution of any of the process program is cancelled.

As will have been understood from the foregoing description, a printer control system for a printer apparatus connected to an information processing unit is herein proposed which comprises means (module 42) for forming a visible image on a sheet medium, first memory means (138) for storing a first program (144) for deciphering instructions received from the information processing unit for enabling the image forming means to operate in accordance with the instructions, second memory means (140) for storing a second program (148) for converting instructions received from the information processing unit into those which can be deciphered by the first memory means, and control means (80) for executing the first and second programs to control the operation of the printer apparatus, wherein the first and second programs are to be executed at controlled timings. The second program (148) is in the embodiment described implemented by the user program and may be stored in the font memory unit 96 or a built-in ROM device which may be incorporated in the central processing unit 120 or may be loaded down from the data processor unit 82. The font memory unit 96 may be implemented in the form of a cartridge detachably set to the printer apparatus 40. With use of such a second program (148), the printer apparatus acting as one of the input/output units associated with the host system implemented by the data processor unit 82 is permitted to cope with the protocol of the host system without having recourse to modification of the software configuration of the input/output unit.

What is claimed is:

1. An image reproducing apparatus for reproducing on a record medium an image corresponding to image data supplied from a data supply device, comprising:
   a) image recording means for forming a visible image on a record medium,
   b) first memory means for storing a plurality of process programs each for activating said image recording means,
   c) program selecting means responsive to an instruction signal from said data supply device for selecting any one of said process programs,
   d) control means for controlling said image recording means in accordance with the selected process program for enabling the recording means to reproduce on said record medium an image corresponding to the image data supplied from said data supply device,
   e) second memory means for storing data for printing information for testing purposes,
   f) memory control means for storing into said second memory means data corresponding to the selected process program,
   g) instruction input means for entering an instruction for staring the printing operation for said testing purposes, and
   h) second control means for controlling said image recording means to reproduce on the record medium an image corresponding to the data stored in said second memory means.

2. An image reproducing apparatus as set forth in claim 1, in which said control means is operative to analyze the image data from said data supply device in accordance with the selected process program.

3. In an image reproducing apparatus including image recording means for forming a visible image on a record medium, memory means for storing a plurality of process programs each for controlling the operation of the image recording means, and control means for controlling said image recording means in accordance with a selected one of the process programs for enabling the recording means to reproduce on said record medium an image corresponding to the image data supplied from a data processing device, a method comprising the steps of:

a) decoding an instruction signal from said data processing device, b) selecting any one of said process programs on the basis of the decoded instruction signal, c) controlling said image recording means in accordance with the selected process program for enabling the recording means to reproduce on said record medium an image corresponding to the image data supplied from said data processing device, d) storing into a second memory means data corresponding to the selected process program to be printed for testing purposes, and e) controlling said image recording means to reproduce on the record medium an image corresponding to the data stored in said second memory means.

4. An image reproducing apparatus for reproducing on a record medium an image corresponding to image data supplied from a data supply device, comprising:

a) image recording means for forming a visible image on a record medium, b) memory means having a plurality of data storage areas, c) memory control means for loading process programs into said data storage areas, respectively, each of the process programs being operable for activating said image recording means, d) program selecting means responsive to an instruction signal from said data supply device for selecting any one of said process programs, e) control means for controlling said image recording means in accordance with the selected process program for enabling the record means to reproduce on said record medium an image corresponding to the image data supplied from said data supply device, f) second memory means for storing data for printing information for testing purposes, g) memory control means for storing into said second memory means data corresponding to the selected process program, h) instruction input means for entering an instruction for starting the printing operation for said testing purposes, and i) second control means for controlling said image recording means to reproduce on the record medium an image corresponding to the data stored in said second memory means.

5. An image reproducing apparatus as set forth in claim 4, in which said control means is operative to analyze the image data from said data supply device in accordance with the selected process program.

6. In an image reproducing apparatus including image recording means for forming a visible image on a record medium, memory means having a plurality of data storage areas, and control means for controlling said image recording means to reproduce on said record medium an image corresponding to the image data supplied from a data processing device, a method comprising the steps of:

a) storing process programs into said data storage areas of said memory means, respectively, each of the process programs being operable for activating said image recording means, b) decoding an instruction signal from said data processing device, c) selecting any one of said process programs on the basis of the decoded instruction signal, d) controlling said image recording means in accordance with the selected process program for enabling the recording means to reproduce on said record medium an image corresponding to the image data supplied from said data processing device, e) storing into a second memory means data corresponding to the selected process program to be printed for testing purposed, and f) controlling said image recording means to reproduce on the record medium an image corresponding to the data stored in said second memory means.

7. An image reproducing apparatus for reproducing on a record medium an image corresponding to image data supplied from a data supply device, comprising a) image recording means for forming a visible image on a record medium, b) memory means for storing a plurality of process programs each for activating said image recording means, c) program selecting means responsive to an instruction signal from said data supply device for selecting any one of said process programs, d) control means for controlling said image recording means in accordance with the selected process program for enabling the recording means to reproduce on said record medium an image corresponding to the image data supplied from said data supply device, e) test mode means for selecting a test printing mode of operation, and f) second control means for reading data corresponding to test information to be printed during said test printing mode of operation from said data supply device and for controlling said image recording means in accordance with the selected process program for enabling the recording means to reproduce on said record medium an image corresponding to the data corresponding to the test information read from said data supply device.

8. An image reproducing apparatus as set forth in claim 7, in which said control means is operative to analyze the image data from said data supply device in accordance with the selected process program.

9. An image reproducing apparatus for reproducing on a record medium an image corresponding to image data supplied from a data supply device, comprising a) image recording means for forming a visible image on a record medium, b) memory means having a plurality of data storage areas, c) memory control means for loading process programs into said data storage areas, respectively, each of the process programs being operable for activating said image recording means, d) program selecting means responsive to an instruction signal from said data supply device for selecting any one of said process programs, e) control means for controlling said image recording means in accordance with the selected process program for enabling the record means to reproduce on said record medium an image corresponding to the image data supplied from said data supply device, f) test mode selecting means for selecting a test printing mode, and g) control means for reading data corresponding to test information to be printed during said test printing mode of operation from said data supply device and for controlling said image recording means in accordance with the selected process program for enabling the recording means to reproduce on said record medium an image corresponding to said data corresponding to test information read from said data supply device.

10. An image reproducing apparatus as set forth in claim 9, in which said control means is operative to analyze the image data from said data supply device in accordance with the selected process program.

11. An image reproducing apparatus connected to a data supply device by means of a data line for reproducing on a recording medium an image corresponding to image data supplied from a data supply device via said data line, said apparatus comprising:
   a) image recording means for forming a visible image on a record medium,
   b) memory means for storing a plurality of process programs each for activating said image recording means,
   c) program selecting means responsive to an instruction signal from said data supply device via said data line for selecting one of said process programs, and
   d) control means for controlling said image recording means in accordance with the selected process program.

12. In an image recording apparatus connected to a data processing device by means of a data line, said reproducing apparatus including image recording means for forming a visible image on a record medium, memory means for storing a plurality of process programs each for controlling the operation of the image recording means, and control means for controlling said image recording means in accordance with a selected one of the process programs for enabling the recording means to reproduce on said record medium an image corresponding to the image data supplied from a data processing device via said data line, a method comprising the steps of:
   receiving an instruction signal from said data processing device via said data line,
   decoding the instruction signal,
   selecting any one of said process programs on the basis of the decoded instruction signal, and
   controlling said image recording means in accordance with the selected process program.

13. In an image reproducing apparatus including image recording means for forming a visible image on a record medium, memory means having a plurality of data storage areas, and control means for controlling said image recording means to reproduce on said record medium an image corresponding to the image data supplied from a data processing device, a method comprising the steps of:
   storing process programs into said data storage areas of said memory means, respectively, each of the process programs being operable for activating said image recording means,
   decoding an instruction signal supplied from said data processing device,
   selecting any one of said process programs on the basis of the decoded instruction signal, and
   controlling said image recording means in accordance with the selected process program.

14. An image reproducing apparatus connected to a data supply device by means of a data line for reproducing on a recording medium an image corresponding to image data supplied from a data supply device via said data line, said apparatus comprising:
   a) image recording means for forming a visible image on a record medium,
   b) first memory means for storing a first process program for activating said image recording means,
   c) second memory means for storing a second process program for activating said image recording means, said second process being transmitted from said data supply device via said data line,
   d) program selecting means responsive to an instruction signal from said data supply device via said data line for selecting one of said process programs, and
   e) control means for controlling said image recording means in accordance with the selected process program.

15. In an image reproducing apparatus connected to a data processing device by means of a data line, said reproducing apparatus including image recording means for forming a visible image on a record medium, memory means for storing a plurality of process programs each for controlling the operations of the image recording means, and control means for controlling said image recording means in accordance with a selected one of the process programs for enabling the recording means to reproduce on said record medium an image corresponding to the image data supplied from a data processing device via said data line, a method comprising the steps of:
   receiving a special processing program from said data processing device via said data line,
   storing said special processing program into said memory means,
   receiving an instruction signal from said data processing device via said data line,
   decoding the instruction signal,
   selecting any one of said processing programs on the basis of the decoded instruction signal, and
   controlling said image recording means in accordance with the selected process program.

* * * * *